United States Patent
Neiger et al.

(10) Patent No.: US 7,313,669 B2
(45) Date of Patent: Dec. 25, 2007

(54) VIRTUAL TRANSLATION LOOKASIDE BUFFER

(75) Inventors: Gilbert Neiger, Portland, OR (US); Stephen Chou, North Plainfield, NJ (US); Erik Cota-Robles, Portland, OR (US); Stalinselvaraj Jeyasingh, Portland, OR (US); Alain Kagi, Portland, OR (US); Michael Kozuch, Beaverton, OR (US); Richard Uhlig, Hillsboro, OR (US); Sebastian Schoenberg, Dresden (DE)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 11/069,889

(22) Filed: Feb. 28, 2005

(65) Prior Publication Data

US 2005/0240751 A1   Oct. 27, 2005

Related U.S. Application Data

(63) Continuation of application No. 09/752,133, filed on Dec. 27, 2000, now Pat. No. 6,907,600.

(51) Int. Cl.
 *G06F 12/00* (2006.01)
(52) U.S. Cl. .................. 711/207; 711/118; 711/156; 711/170; 711/205; 711/203; 717/148; 718/1
(58) Field of Classification Search ........... 711/207, 711/118, 156, 170, 203, 205, 148; 718/1
See application file for complete search history.

(56) References Cited

U.S. PATENT DOCUMENTS

| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |

(Continued)

FOREIGN PATENT DOCUMENTS

DE   42177444 A1   12/1992

(Continued)

OTHER PUBLICATIONS

Hall, Judith S., et al., "Virtualizing the VAX Architecture," ACM Sigarch Computer Architecture News, Proceedings of the 18th annual international symposium on Computer architecture, vol. 19, Issue No. 3, Apr. 1991, 10 pages.

(Continued)

*Primary Examiner*—Stephen C. Elmore
(74) *Attorney, Agent, or Firm*—Blakely, Sokoloff, Taylor & Zafman LLP

(57) ABSTRACT

In one embodiment, a method for supporting address translation in a virtual-machine environment includes creating a guest translation data structure to be used by a guest operating system for address translation operations, creating an active translation data structure based on the guest translation data structure, and periodically modifying the content of the active translation data structure to conform to the content of the guest translations data structure. The content of the active translation data structure is used by a processor to cache address translations in a translation-lookaside buffer (TLB).

22 Claims, 15 Drawing Sheets

U.S. PATENT DOCUMENTS

| | | |
|---|---|---|
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,214 A | 12/1981 | McDaniel et al. |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,456,954 A | 6/1984 | Bullions, III et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,381,535 A | 1/1995 | Gum et al. |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. |
| 5,633,929 A | 5/1997 | Kaliski |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,751,990 A * | 5/1998 | Krolak et al. ............ 711/207 |
| 5,752,046 A | 5/1998 | Oprescu et al. |
| 5,757,604 A | 5/1998 | Bennett et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,835,964 A * | 11/1998 | Draves et al. ............ 711/207 |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,021,481 A | 2/2000 | Eickemeyer |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |

| | | |
|---|---|---|
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter et al. |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,446,189 B1 | 9/2002 | Zuraski, Jr. et al. |
| 6,463,535 B1 | 10/2002 | Drews et al. |
| 6,463,537 B1 | 10/2002 | Tello |
| 6,493,812 B1 * | 12/2002 | Lyon .................. 711/207 |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,510,508 B1 | 1/2003 | Zuraski, Jr. et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,625,714 B1 * | 9/2003 | Lyon .................. 711/207 |
| 6,633,963 B1 | 10/2003 | Ellison et al. |
| 6,633,981 B1 | 10/2003 | Davis |
| 6,651,132 B1 * | 11/2003 | Traut .................. 711/6 |
| 6,651,171 B1 | 11/2003 | England et al. |
| 6,678,825 B1 | 1/2004 | Ellison et al. |
| 6,684,326 B1 | 1/2004 | Cromer et al. |
| 6,704,925 B1 * | 3/2004 | Bugnion .............. 717/138 |
| 6,760,909 B1 * | 7/2004 | Draves et al. ........ 718/102 |
| 6,789,156 B1 | 9/2004 | Waldspurger |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0473913 | 3/1992 |
| EP | 0600112 | 6/1994 |
| EP | 0600112 A1 | 6/1994 |
| EP | 0602867 | 6/1994 |
| EP | 0892521 | 1/1999 |
| EP | 0930567 | 7/1999 |
| EP | 0930567 A3 | 7/1999 |
| EP | 0961193 | 12/1999 |
| EP | 0965902 | 12/1999 |
| EP | 1030237 A1 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1209563 | 5/2002 |
| EP | 1271277 | 1/2003 |
| JP | 76139 A0 | 3/2000 |
| WO | WO9524696 | 9/1995 |
| WO | WO97/29567 A1 | 8/1997 |
| WO | WO9812620 | 3/1998 |
| WO | WO98/34365 | 8/1998 |
| WO | WO09834365 | 8/1998 |
| WO | WO98/44402 | 10/1998 |
| WO | WO9844402 | 10/1998 |
| WO | WO99/05600 | 2/1999 |
| WO | WO99/09482 | 2/1999 |
| WO | WO9905600 | 2/1999 |
| WO | WO9918511 | 4/1999 |
| WO | WO99/57863 | 11/1999 |
| WO | WO9957863 | 11/1999 |
| WO | WO99/65579 | 12/1999 |
| WO | WO9965579 | 12/1999 |
| WO | WO0021238 | 4/2000 |
| WO | WO 00/62232 | 10/2000 |
| WO | WO0062232 | 10/2000 |
| WO | WO 01/27723 A2 | 4/2001 |
| WO | WO 01/27821 A2 | 4/2001 |
| WO | WO0163994 | 8/2001 |
| WO | WO 01/75564 | 10/2001 |
| WO | WO 01/75565 A2 | 10/2001 |
| WO | WO 01/75595 A2 | 10/2001 |
| WO | WO0201794 | 1/2002 |
| WO | WO9909482 | 1/2002 |
| WO | WO 02/17555 | 2/2002 |
| WO | WO02060121 | 8/2002 |
| WO | WO 02/086684 | 10/2002 |
| WO | WO03058412 | 7/2003 |

OTHER PUBLICATIONS

Crawford, John, "Architecture of the Intel 80386", *Proceedings of the IEEE International Conference on Computer Design: VLSI in Computers and Processors (ICCD '86)*, (Oct. 6, 1986), 155-160.

HP Mobile Security Overview, "HP Mobile Security Overview", (Sep. 2002), 1-10.

IBM Corporation, "IBM ThingPad T30 Notebooks", *IBM Product Specification*, located at www-1.ibm.com/services/files/cisco_t30_spec_sheet_070202.pdf, last visited Jun. 23, 2004, (Jul. 2, 2002), 1-6.

Intel Corporation, "Intel 82802AB/82802AC Firmware Hub (FWH)", *Intel Product Datasheet*, Document No. 290658-004, (Nov. 2000), 1-6, 17-28.

Menezes, Alfred J., et al., "Handbook of Applied Cryptography", *CRC Press Series on Discrete Mathematices and its Applications*, Boca Raton, FL, XP002165287, ISBN 0849385237, (Oct. 1996), 403-405, 506-515, 570.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995), 47-52.

Schneier, Bruce, "Applied Cryptography: Protocols, Algorithm, and Source Code in C", *Wiley, John & Sons, Inc.*, XP002138607; ISBN 0471117099,(Oct. 1995), 56-65.

Schneier, Bruce, "Applied Cryptography: Protocols, Algorithm, and Source Code C", *Wiley, John & Sons, Inc.*, XP0021111449; ISBN 0471117099,(Oct. 1995). 169-187.

Schneier, Bruce, "Applied Cryptography: Protocols, Algorithms, and Source Code In C", *2nd Edition; Wiley, John & Sons, Inc.*, XP002251738; ISBN 0471128457,(Nov. 1995), 28-33; 176-177; 216-217; 461-473; 518-522.

Coulouris, George, et al., "Distributed Systems, Concepts and Designs", *2nd Edition*, (1994), 422-424.

Intel Corporation, "IA-64 System Abstraction Layer Specification", *Intel Product Specification, Order Number 245359-001*, (Jan. 2000),1-112.

Intel Corporation, "Intel IA-64 Architecture Software Developer's Manual", *vol. 2: IA-64 System Architecture, Order No. 245318-001*, (Jan. 2000), i, ii, 5.1-5.3, 11.1-11.8, 11.23-11.26.

Heinrich, J., "MIPS R4000 Microprocessor User's Manual, " Chapter 4, Memory Management, pp. 61-97, 1993.

Berg, Cliff, "How Do I Create A Signed Applet?" Dr. Dobb's Journal, Aug. 1997, pp. 1-9.

Gong, Li, e tal., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Second Edition, Chapter 4: Memory Management, pp. 67-79.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently On A IA32 PC Using Virtualization Techniques," http://www.plex86.org/research/paper.txt., pp. 1-31, downloaded Aug. 9, 2001.

Motorola, M68040 User's Manual (Including the MC68040, MC68040V, MC68LC040, MC68EC040, and CM68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Intel, "IA-32 Intel Architecture Software Developer's Manual", *vol.. 3: System Programming Guide*, Intel Corporation—2003, 13-1 through 13-24.

Berg, Cliff, "How Do I Create a Signed Applet?", *Dr. Dobb's Journal*, Aug. 1997), 1-9.

Brands, Stefan, "Restrictive Blinding of Secret-Key Certificates", *Springer-Verlag* XP002201306, (1995),Chapter 3.

Bugnion et al, Disco: Running Commodity Operating Systems on Scalable Multiprocessors, author: ACM, Oct. 1997.

Chien, Andrew A., et al., "Safe and Protected Execution for the Morph/AMRM Reconfigurable Processor", *7th Annual IEEE Symposium, FCCC '99 Proceedings*, XP010359180, ISBN 0-7695-0375-6, Los Alamitos, CA (Apr.21, 1999),209-221.

Chiuch et al, Eliminating the Address Translation Bottleneck for Physical Address Cache, author: ACM, 1992.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S. , "Capability-Based Addressing", *Fabry, R.S., "Capability-Based Addressing," Communications of the ACM*, vol. 17, No. 7, (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *Computer Magazine*, (Jun. 1974),34-35.

Gong, Li et al., "Going Beyond the Sanbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extend Architecture: Facilities for Virtual Machines", *IBM J. Research Development*, vol. 27, Number 6, (Nov. 1983),530-544.

Huck, et al., Architectural Support for Translation Table Management in Large Address Space Machine, ACM, May 1993.

IBM, "Information Display Technique for a Terminate Stay Resident Progran IBM Technical Disclosure Bulletin", TDB-ACC-No. NA9112156, Vol. 34, Issue 7A, (Dec. 1, 1991),156-158.

Intel, "Intel386 DX Microprocessor 32-Bit CHMOS Microprocessor With Integrated Memory Management", (1995),5-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference, Proceedings 1996 Asia-Pacific Seoul, South Korea 4-7 Dec. 1996*, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn , et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press LLC, USA* XP002201307, (19997),475.

Motorola, "M68040 User's Manual", (1993),1-1 to 8-32.

Nanba, S. , et al., "VM/4: ACOS-4 Virtual Machine Architecture", *VM/4: ACOS-4 Virtual Machine Architecture, IEEE*, (1985),171-178.

Richt, Stefan , et al., "In-Circuit-Emulator Wird Echtzeittauglich", *Electronic, Franzis Verlag GmbH*, Munchen, DE, vol. 40, No. 16, XP000259620,(100-103),8-6-1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M. , "Virtual Platform: A Virtual Machine Monitor for Commodity PC", *Proceedings of the 11th Hotchips Conference*, (Aug. 17, 1999),185-196.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering*, University of California, San Diego, La Jolla, CA, (Nov. 2001).

U.S. Appl. No. 09/752,133, Office Action dated Apr. 23, 2003, 8 pages.

U.S. Appl. No. 09/752,133, Notice of Allowance dated Nov. 12, 2004, 6 pages.

U.S. Appl. No. 09/752,133, Notice of Allowance dated Mar. 1, 2004, 3 pages.

U.S. Appl. No. 09/752,133, Supplemental Notice of Allowance dated Apr. 27, 2005, 2 pages.

\* cited by examiner

VIRTUAL TRANSLATION LOOKASIDE BUFFER

RELATED APPLICATIONS

This application is a continuation of U.S. patent application Ser. No. 09/752,133, filed Dec. 27, 2000 now U.S. Pat. No. 6,907,600.

FIELD OF THE INVENTION

The present invention relates generally to virtual machines, and more specifically to supporting address translation in a virtual machine environment.

BACKGROUND OF THE INVENTION

A conventional virtual-machine monitor (VM monitor) typically runs on a computer and presents to other software the abstraction of one or more virtual machines. Each virtual machine may function as a self-contained platform, running its own "guest operating system" (i.e., an operating system hosted by the VM monitor). The guest operating system expects to operate as if it were running on a dedicated computer rather than a virtual machine. That is, the guest operating system expects to control various computer operations and have an unlimited access to the computer's physical memory and memory-mapped I/O devices during these operations. For instance, the guest operating system expects to maintain control over address-translation operations and have the ability to allocate physical memory, provide protection from and between guest applications, use a variety of paging techniques, etc. However, in a virtual-machine environment, the VM monitor should be able to have ultimate control over the computer's resources to provide protection from and between virtual machines.

Thus, an address-translation mechanism is needed that will support attempts of a guest operating system to control address translation while enabling a VM monitor to retain ultimate control over address translation and computer resources.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
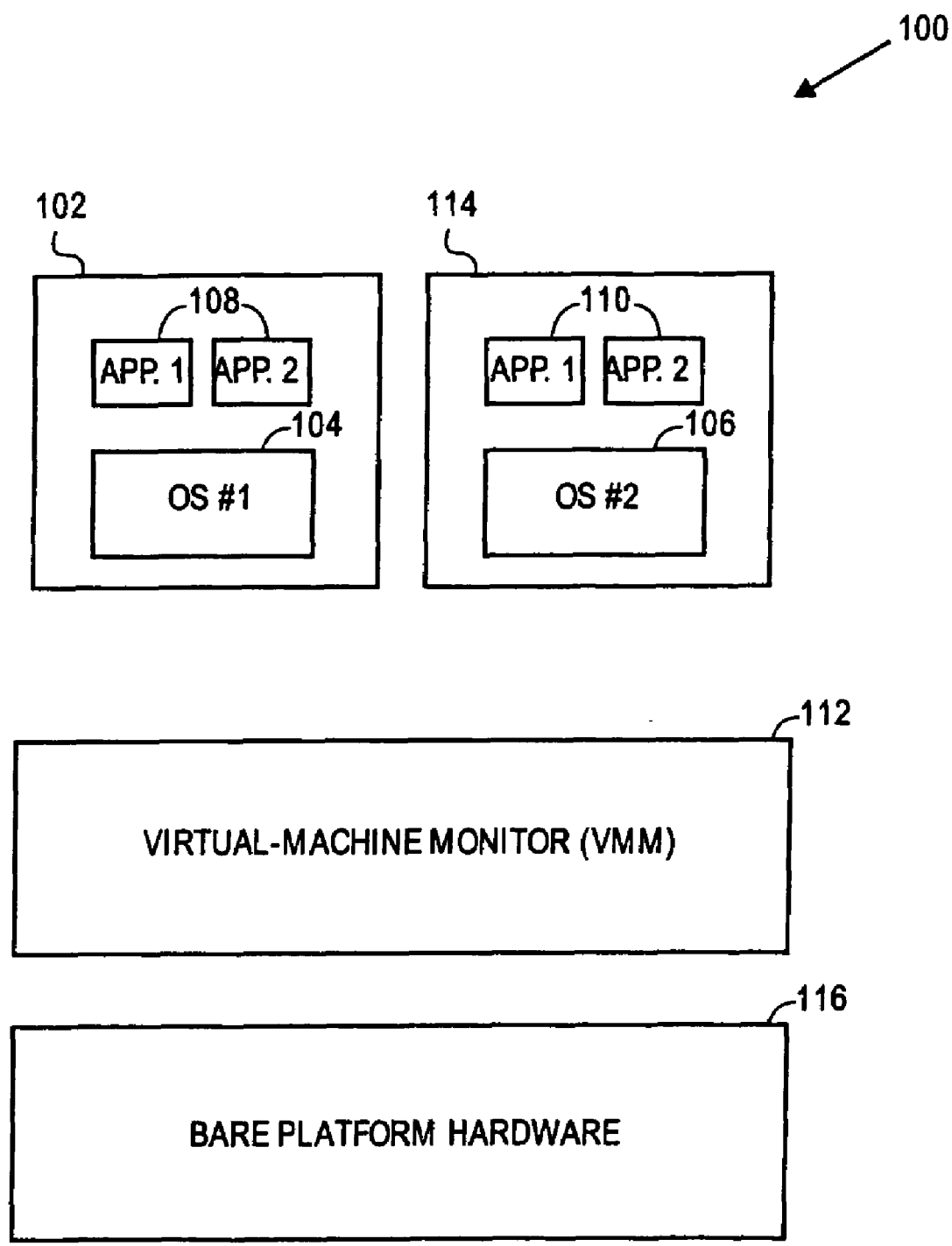
FIG. 1 illustrates one embodiment of a virtual-machine environment.

A method and apparatus for supporting address translation are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for supporting address translation in a virtual machine environment. FIG. 1 illustrates one embodiment of a virtual-machine environment 100, which employs a virtual-machine monitor (VMM) 112. In this embodiment, bare platform hardware 114 comprises a computing platform, which may be capable, for example, of executing a standard operating system (OS) or a virtual-machine monitor (VMM), such as VMM 112. A VMM, though typically implemented in software, may export a bare machine interface, such as an emulation, to higher level software. Such higher level software may comprise a standard or real-time OS, although the invention is not limited in scope in this respect and, alternatively, for example, a VMM may be run within, or on top of, another VMM. VMMs and their typical features and functionality are well-known by those skilled in the art and may be implemented, for example, in software, firmware or by a combination of various techniques.

As described above, a VMM presents to other software (i.e., "guest" software) the abstraction of one or more virtual machines (VMs). FIG. 1 shows two VMs, 102 and 114. Each VM includes a guest OS such as guest OS 104 or 106 and various guest software applications 108-110. Each of guest OSs 104 and 106 expects to control access to physical resources (e.g., memory and memory-mapped I/O devices) within the hardware platform on which the guest OS 104 or 106 is running and to perform other functions. For instance, during address-translation operations, the guest OS expects to allocate physical memory, provide protection from and between software applications (e.g., applications 108 or 110), use a variety of paging techniques, etc. However, in a virtual-machine environment, VMM 112 should be able to have ultimate control over the physical resources to provide protection from and between VMs 102 and 114. This conflict between the expectations of the guest OS and the role of the VMM becomes an issue during address-translation operations initiated by the VM.

A conventional address-translation mechanism is typically based on a translation lookasdide buffer (TLB), an in-processor structure that acts as a cache for previously processed address translations. A TLB may be either hardware-managed (i.e., fully managed by the processor) or software-managed (i.e., accessed by the processors but managed by software). The VMM can manage a software-managed TLB, thereby retaining control over address translation. The problem arises if the processor supports only hardware-managed TLBs over which the VMM has no direct control. The present invention addresses this problem by providing an address-translation mechanism that supports attempts of the guest OS to control address translation while enabling the VMM to retain ultimate control over address translation and computer resources.

A prior art address-translation mechanism that uses a hardware-managed TLB will now be described in more detail. Although address translation features are described below as applied to IA-32 microprocessors, many of these features apply as well to a variety of other microprocessors that support hardware-managed TLBs.

Figure 2:
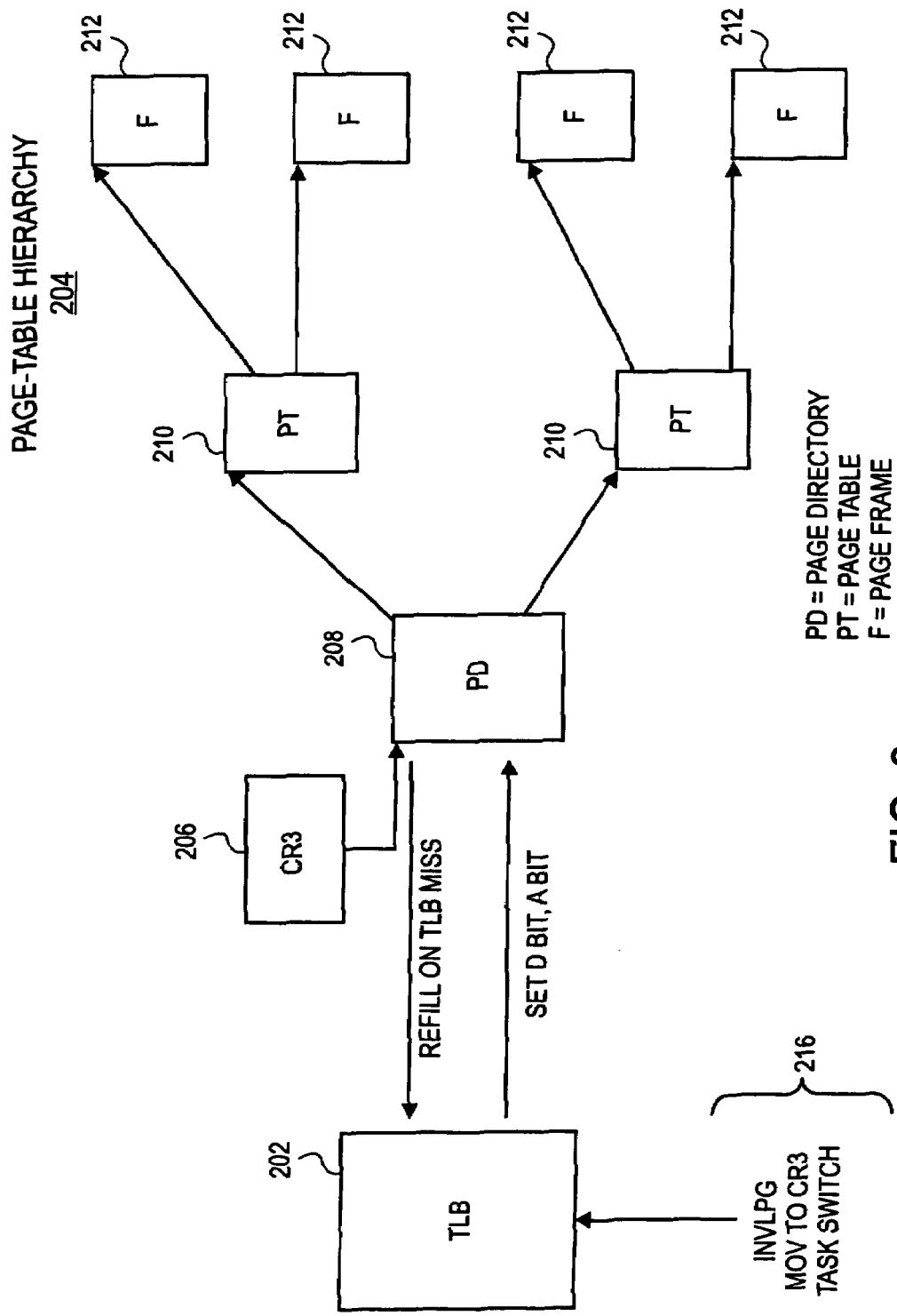
FIG. 2 illustrates a prior-art embodiment of an address-translation mechanism that supports a hardware-managed TLB.

Referring to FIG. 2, address translation is controlled by a TLB 202 and a page-table hierarchy 204. Page-table hierarchy 204, which is referenced by the processor's control register CR3 (i.e., block 206), is a translation data structure used to translate a virtual memory address into a physical memory address when paging is enabled. Page-table hierarchy 204 includes a page directory (PD) 208, a set of page tables (PTs) 210, and multiple page frames (Fs) 212. Page-table hierarchies and their typical features and functionality are well known by those skilled in the art.

Typically, translation of a virtual memory address into a physical memory address begins with searching TLB 202 using either the upper 20 bits (for a 4 KB page) or the upper 10 bits (for a 4 MB page) of the virtual address. If a match is found (a TLB hit), the upper bits of a physical page frame that are contained in TLB 202 are conjoined with the lower bits of the virtual address to form a physical address. If no match is found (a TLB miss), the processor consults the page table hierarchy 204 to determine the virtual-to-physical translation, which is then cached in TLB 202.

Each entry in PD 208 and PTs 210 typically includes three bits that control use of translations generated by this entry: the present (P) flag, the user/supervisor (U/S) flag, and the read/write (R/W) flag. The P flag indicates whether or not the structure referenced by the entry is valid. If the translation process accesses a PD entry or a PT entry whose P bit is clear, the process stops at this point and a page fault is generated. The U/S flag controls access based on privilege level. The R/W flag controls access based on access type (i.e., read or write).

In addition, each entry in PD 208 and PTs 210 contains two bits that are automatically set by the processor on certain accesses. These bits are an accessed (A) bit and a dirty (D) bit. The A bit of a PD entry or PT entry that points to a page frame is set whenever the page frame is read or written; the D bit is set whenever the page frame is written. The A bit of a PD entry that points to a PT is set whenever that PT is accessed using page table hierarchy 204.

The translations cached in TLB 202 include information about page-access rights (i.e., information derived from the U/S and R/W bits) and page usage (the A and D bits). If the page-table hierarchy is modified, TLB 202 may become inconsistent with the page-table hierarchy 204 if a corresponding address translation exits in TLB 202. Typically, the processor allows software to resolve such an inconsistency. For instance, IA-32 processors allow software to invalidate cached translations in TLB 202 by using the INVLPG instruction, which takes a virtual address as an operand. Any translation for that virtual address is removed from TLB 202. In addition, when the address space (i.e., the virtual-to-physical mapping) is changed completely, numerous translations may need to be removed from TLB 202. This may be done by loading CR3 (which contains the base address of the page directory), thereby removing all translations from TLB 206. CR3 may be loaded using a MOV instruction or a task switch.

The instructions that explicitly manipulate TLB 202 can be performed only by the privileged software. For instance, for IA-32 microprocessors, INVPLG instructions and MOV CR instructions can only be performed by software running at the most privileged level (i.e., level 0), and the guest OS may require that a task switch be performed only by the most privileged software. As described above, in the virtual-machine environment, the VMM should be able to have ultimate control over physical resources including TLB 202 and to limit access to these resources by guest OSs. In some computer architectures (e.g., architectures using IA-32 microprocessors), this may be accomplished using a guest-deprivileging technique.

Guest deprivileging forces all guest software to run at a hardware privilege level that does not allow that software access to certain hardware resources. For instance, for IA-32 microprocessors, the nature of page-based protection is such that all guest software runs at the least privileged level (i.e., privilege level 3). In the case of some microprocessors (e.g., IA-32 microprocessors), guest deprivileging causes a trap when guest software attempts to access such hardware resources as TLB 202 (e.g., when the guest OS issues any of the instructions 216). The traps can be handled by the VMM, thereby allowing the VMM to retain ultimate control over physical resources.

Guest deprivileging, however, may cause a ring compression problem. That is, because all guest software may run at the same privilege level, the guest operating system may not be protected from guest software applications. One embodiment of the present invention addresses this problem by maintaining different translation data structures (e.g., page-table hierarchies) for guest software at different privilege levels as will be described in greater detail below.

Figure 3:
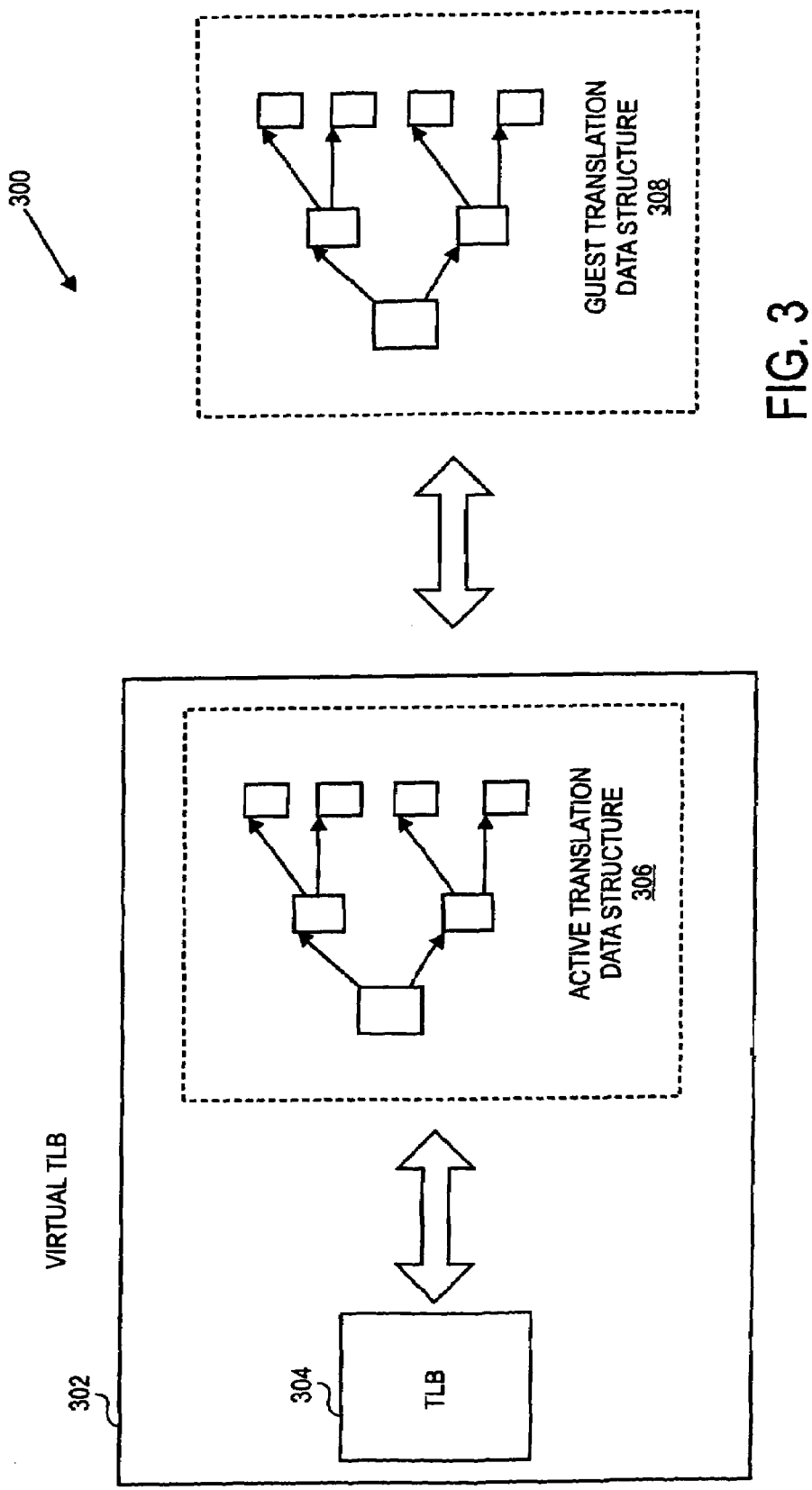
FIG. 3 is a block diagram of an address-translation system according to one embodiment of the present invention.

The present invention provides an address-translation mechanism that supports virtualization. FIG. 3 is a block diagram of an address-translation system 300, according to one embodiment of the present invention. System 300 includes a guest translation data structure 308 and a virtual TLB 302. The guest translation structure 308 indicates how the guest OS intends to translate virtual memory addresses to physical memory addresses. One example of such a translation data structure is a page-table hierarchy 104 described above in conjunction with FIG. 2. However, various other translation data structures may be used with the present invention without loss of generality. The guest translation data structure 308 is managed by the guest OS, which can access and modify any entry in the guest translation data structure.

The virtual TLB 302 supports the guest OS's attempts to control address translation by responding to address-translation operations performed by the guest OS with an interface that emulates the functionality of the processor's physical TLB. Thus, the guest OS is forced to believe that it deals with the physical TLB.

The virtual TLB 302 includes a physical TLB 304 and an active translation data structure 306. The active translation data structure 306 derives its format and content from the guest translation data structure 308. The active translation data structure 306 is created and managed by the VMM. The VMM resolves inconsistencies between the guest translation data structure 308 and the active translation data structure 306 using techniques analogous to those employed by the processor in managing the TLB.

The physical TLB 304 is loaded by the processor with address translations derived from the active translation data structure 306. Accordingly, address translation is controlled by the processor, which manages the physical TLB 304, and by the VMM, which manages the active translation data structure 306. Thus, the virtual TLB provides a mechanism for tolerating and supporting the guest OS's attempts to control address translation while allowing the processor and the VMM to retain ultimate control over all address-translation operations.

In one embodiment, which supports guest deprivileging, more than one active translation data structure is used to address ring-compression problems described above. For instance, in a computer architecture using IA-32 microprocessors, one active translation data structure may be maintained for privilege level 3 (the active user translation data structure) and one active translation data structure may be maintained for privilege level 0 (the active supervisor translation data structure).

Figure 4:
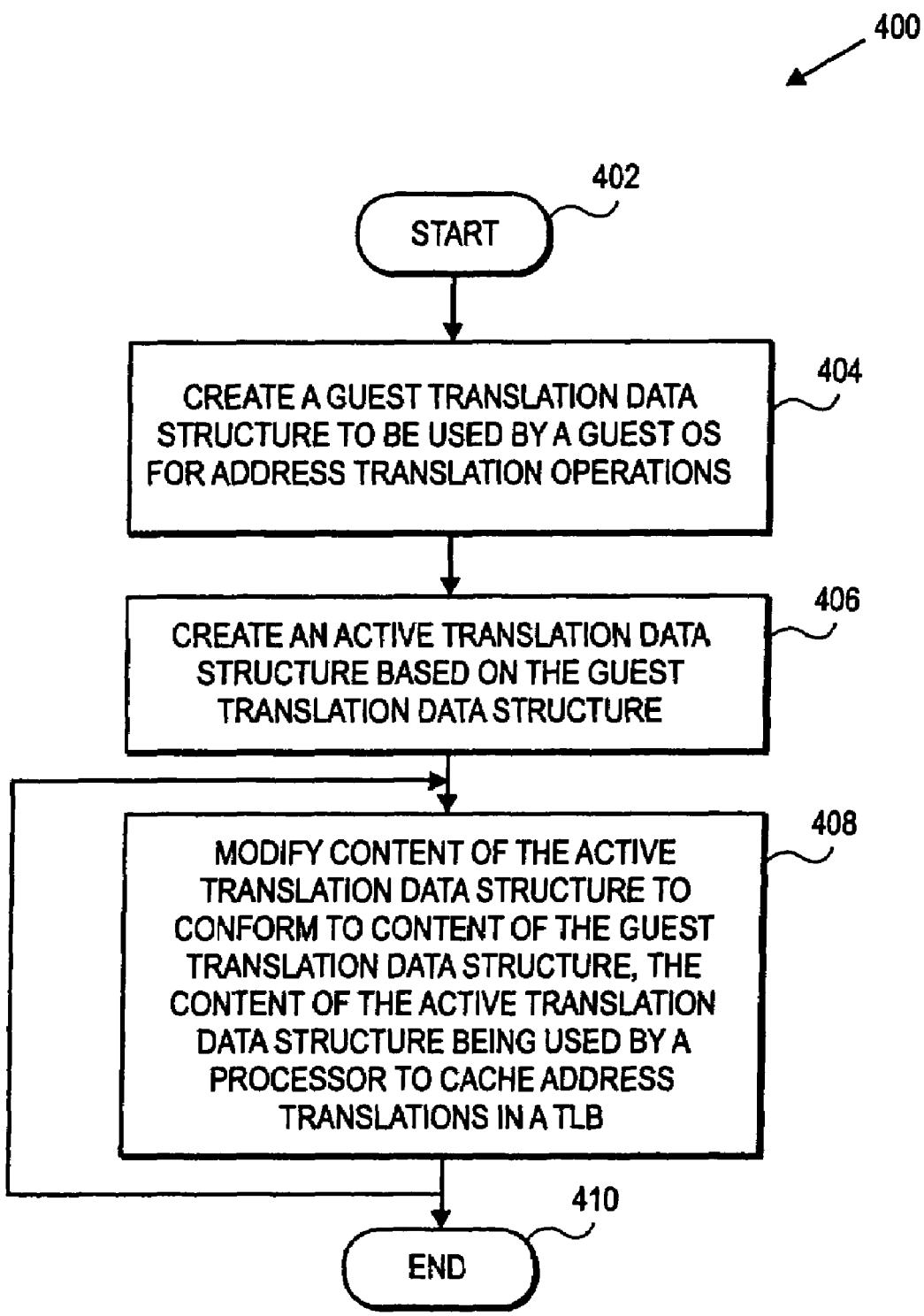
FIG. 4 is a flow diagram of a method for supporting address translation, according to one embodiment of the present invention.

FIG. 4 is flow diagram of a method 400 for supporting address translation, according to one embodiment of the present invention. Method 400 begins with creating a guest translation data structure that will be used by a guest OS for performing address-translation operations (processing block 404). For instance, the guest OS should be able to add, delete or replace entries in the guest translation data structures (e.g., entries in the page directory or page tables), reset flags that control use of the address translations generated by the entries, or otherwise modify the content of the guest translation data structure.

At processing block 406, an active translation data structure is created based on the guest translation data structure. The active translation data structure is managed by the VMM. In one embodiment, a separate active translation data structure is maintained for each virtual machine. Alternatively, two or more virtual machines may share the same active translation data structure. In one embodiment, more than one active translation data structure is maintained for a virtual machine. For instance, in a computer architecture supporting IA-32 processors, an active user translation data structure and an active supervisor translation data structure are maintained for each virtual machine.

Figure 5:
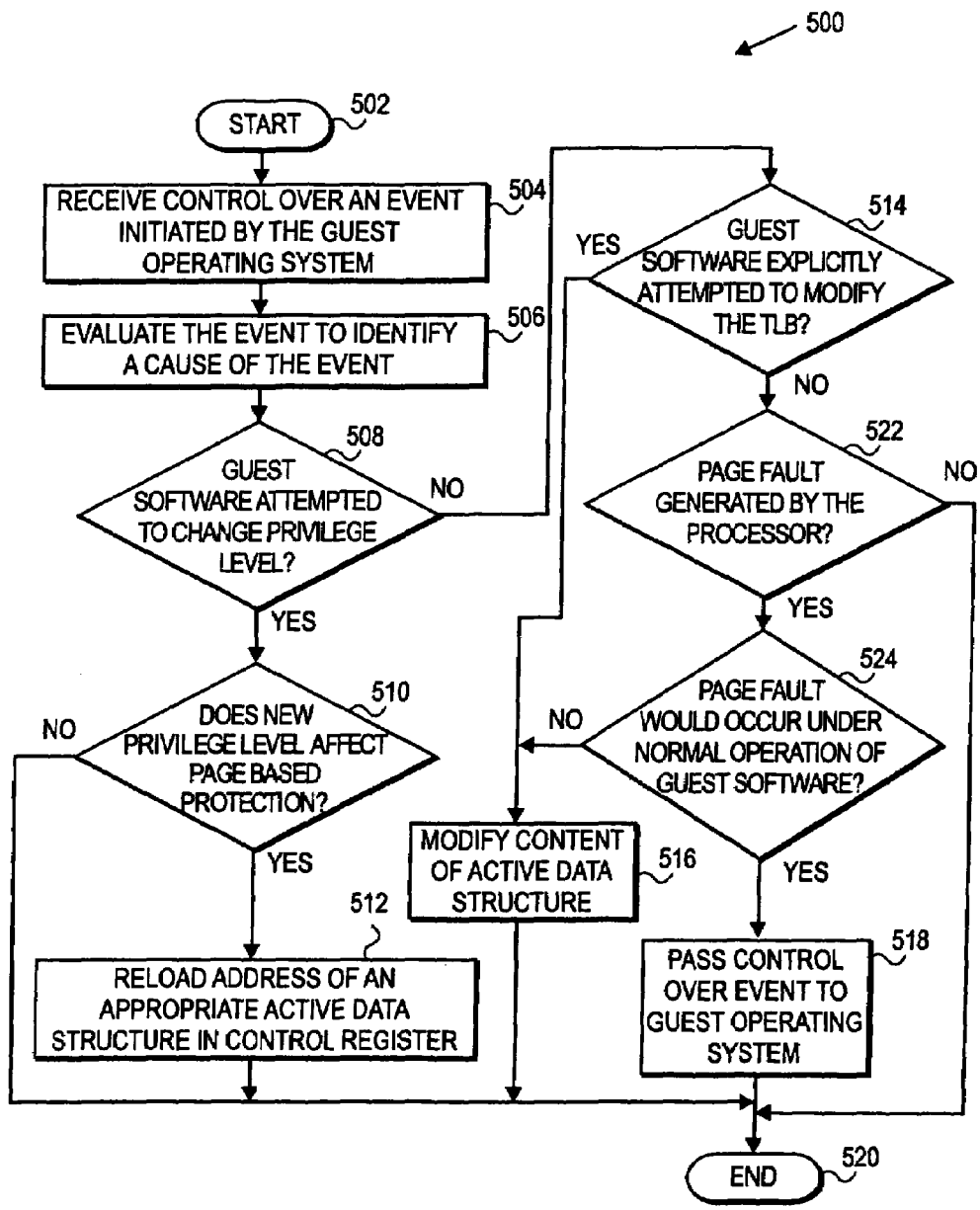
FIG. 5 is a flow diagram of a method 500 for handling events initiated by the guest OS, according to one embodiment of the present invention.

At processing block 408, the content of the active translation data structure is periodically modified to conform to the content of the guest translation data structure. The content of the active translation data structure is then used by the processor to cache address translations in the TLB. The combination of the active translation data structure and the TLB is referred to as a virtual TLB because it provides to the guest operating system the functionality analogous to that of the physical TLB, thereby supporting the guest OS's attempts to control address translation. This functionality is provided using several mechanisms, which will be described in greater detail below. Some of these mechanisms force the guest operating system to issue an event which results in passing control of a corresponding address-translation operation to the VMM. The VMM than evaluates the event and performs an appropriate action. FIG. 5 illustrates one embodiment of a method 500 for handling events initiated by the guest OS.

Referring to FIG. 5, method 500 begins with the VMM's receiving control over an event initiated by the guest OS (processing block 504). In one embodiment, the event initiated by the guest OS may result in a trap that passes control to the VMM. As described above, a trap may be generated as a result of guest deprivileging. However, any other software or hardware technique known in the art may be used to support traps or otherwise enable transfer of control over the event from the guest OS to the VMM. Control may be passed to the VMM in response to various events initiated by the guest OS. Such events may include, for example, events indicating the guest OS's attempts to manipulate the TLB (e.g., for IA-32 microprocessors, these events include instructions 216 shown in FIG. 2), page faults generated by the processor in response to an operation performed by the guest software, changes of privilege level, and other events that may require the VMM's involvement in order to ensure that VMM remains in control of address translation.

At processing block 506, the event is evaluated. In one embodiment, at decision box 508, decision is made to determine whether the event is caused by an attempt of guest software to change its privilege level. If the determination is positive, a further determination is made as to whether the change in the privilege level is sensitive to page-based protection (decision box 510). If the change is sensitive to page-based protection, then at processing block 512, the control register (e.g., CR3) is reloaded with the physical address of the appropriate active translation data structure (e.g., in the case of IA-32 microprocessors, the appropriate active translation data structure is either the active user data structure for a transition into privilege level 3 or the active supervisor data structure for a transition out of privilege level 3). Otherwise, if the change is not sensitive to the page-based protection, no change to the control register is required.

If the determination made at decision box 508 is that the event initiated by the guest OS is not caused by an attempt of guest software to change its privilege level, a further determination is made at decision box 514 as to whether the event is caused by an explicit attempt of the guest software to modify the TLB. If the determination is positive, then the event was generated due to a possible inconsistency between the virtual TLB and the guest translation data structure. Accordingly, the content of the active translation data structure may be modified to conform to the content of the guest translation data structure (processing block 516). In one embodiment, only the entries in the active translation data structure that are associated with the event are modified. In an alternative embodiment (described in greater detail below in conjunction with FIGS. 10A and B), all entries in the active translation data structure that do not match corresponding entries in the guest translation data structure are modified.

If the determination made at decision box 514 is negative, a further determination is made at decision box 522 as to whether the event is associated with a page fault generated by the processor. If the determination is negative, method 500 ends. Otherwise, a further determination is made as to whether the page fault would occur under normal operation of the guest OS (decision box 524). If this determination is positive, then this event requires action on the part of the guest OS, rather than the VMM. Accordingly, at processing block 518, the VMM passes control over the event back to the guest OS, which will handle the event as intended. If the determination made at decision box 524 is negative, i.e., the page fault would not occur under normal operation of the guest OS, then the content of the active translation data structures needs to be analyzed to evaluate whether it is consistent with the content of the guest translation data structure. If any inconsistency is discovered, the content of the active translation data structures is modified to remove the inconsistency (processing block 516).

It should be noted that, for the sake of simplicity, the description of this embodiment does not focus on events that are indicative of an attempt by the guest software to change the privilege level and modify the virtual TLB at the same time.

Various mechanisms provided by the present invention to support the guest OS's attempts to control address translation will now be described in more detail. As discussed above, these mechanisms are used to provide the guest OS with the functionality analogous to that of the physical TLB. These mechanisms are described below with reference to specific IA-32 features as IA-32 microprocessors support various address translation features that are typical for other microprocessors that support hardware-managed TLBs. However, the scope of the present invention should not be so limited. Instead, the present invention is operable with any processor supporting hardware-managed TLBs. In addition, a wide variety of mechanisms other than those described below may be used with the present invention to provide the functionality analogous to that of the physical TLB without loss of generality.

Figure 6:
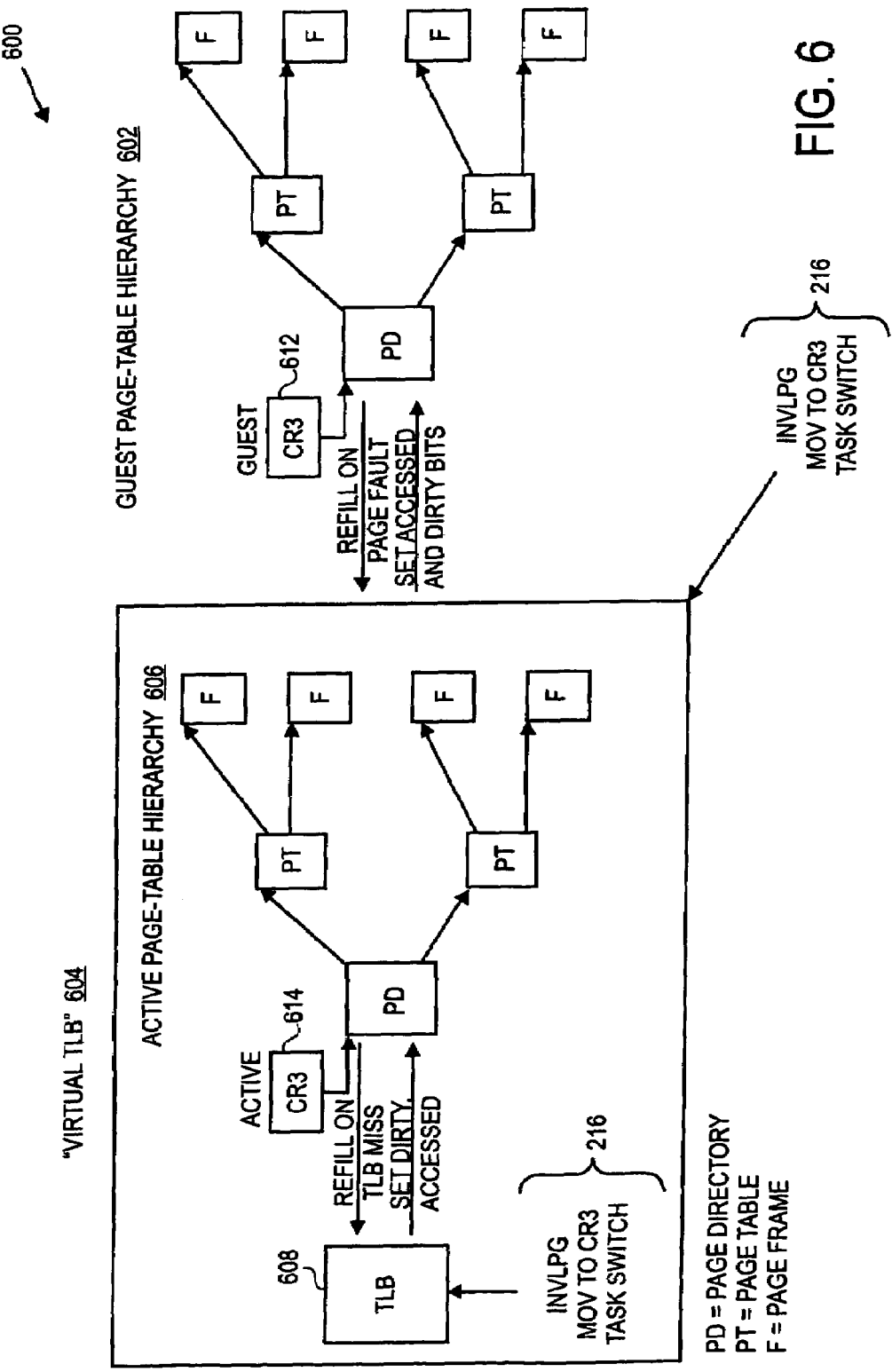
FIG. 6 illustrates operation of a virtual TLB that supports IA-32 address translation, according to one embodiment of the present invention.
Figure 7A:
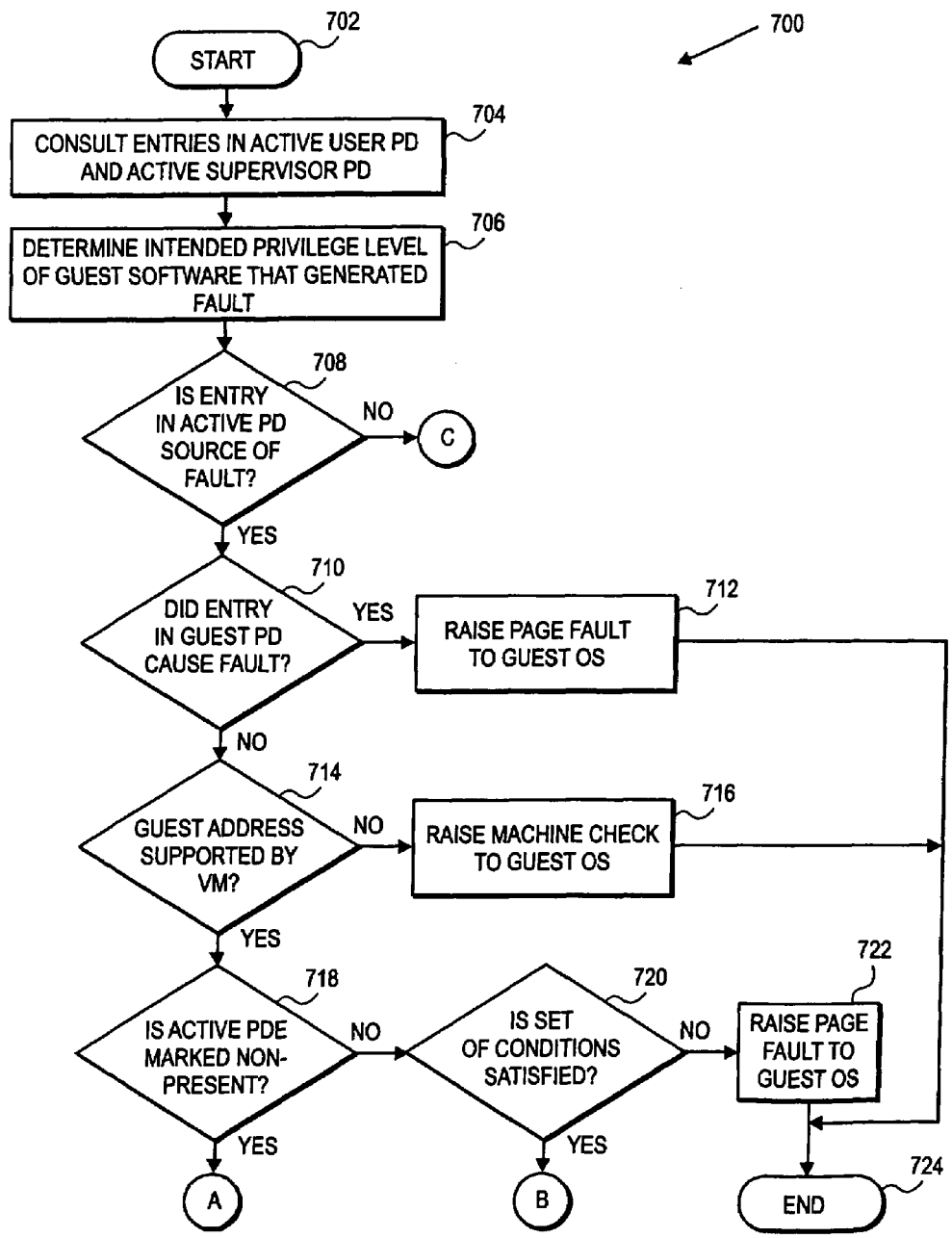
FIGS. 7A-7D are flow diagrams of a method for responding to a page fault, according to one embodiment of the present invention.
Figure 7B:
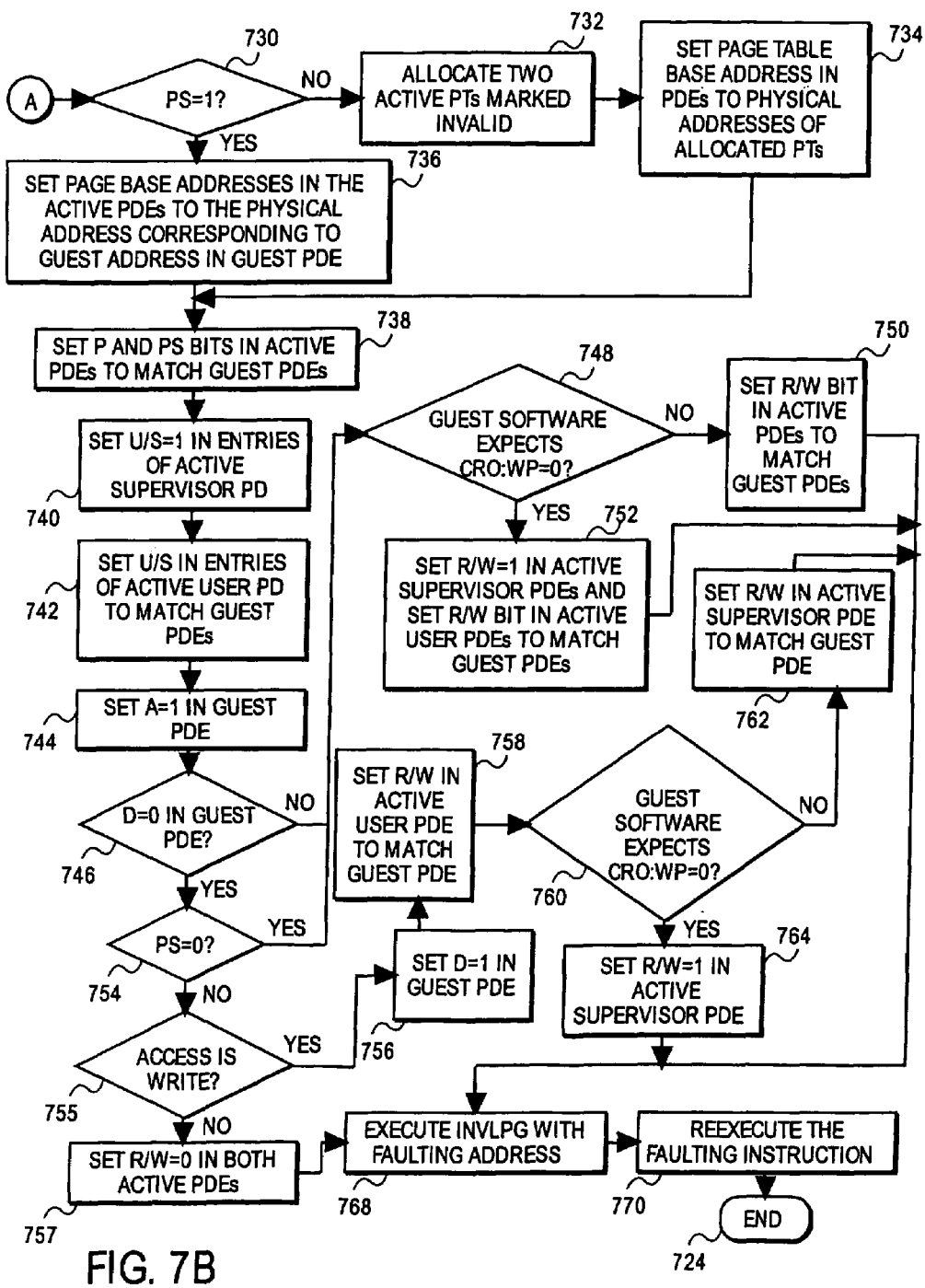
Figure 7C:
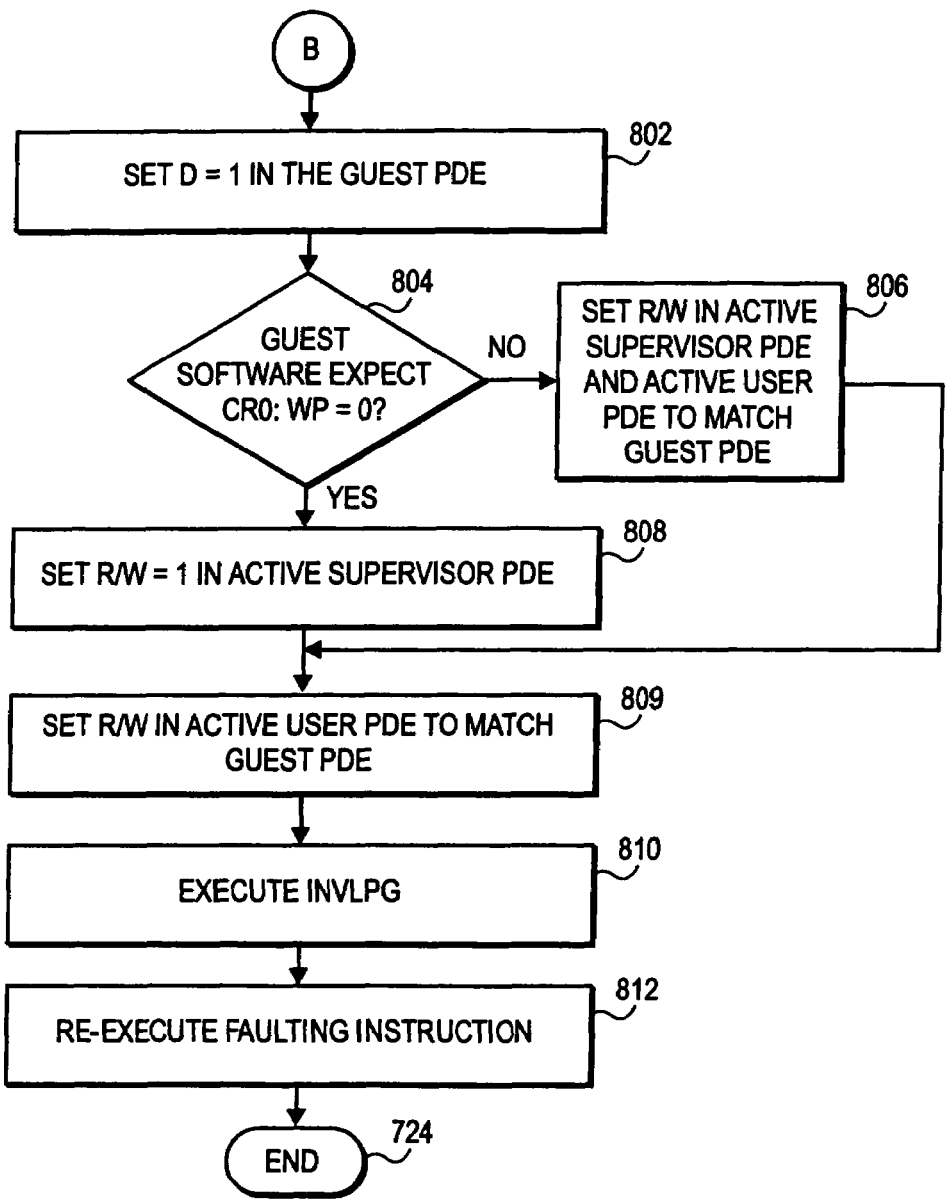
Figure 7D:
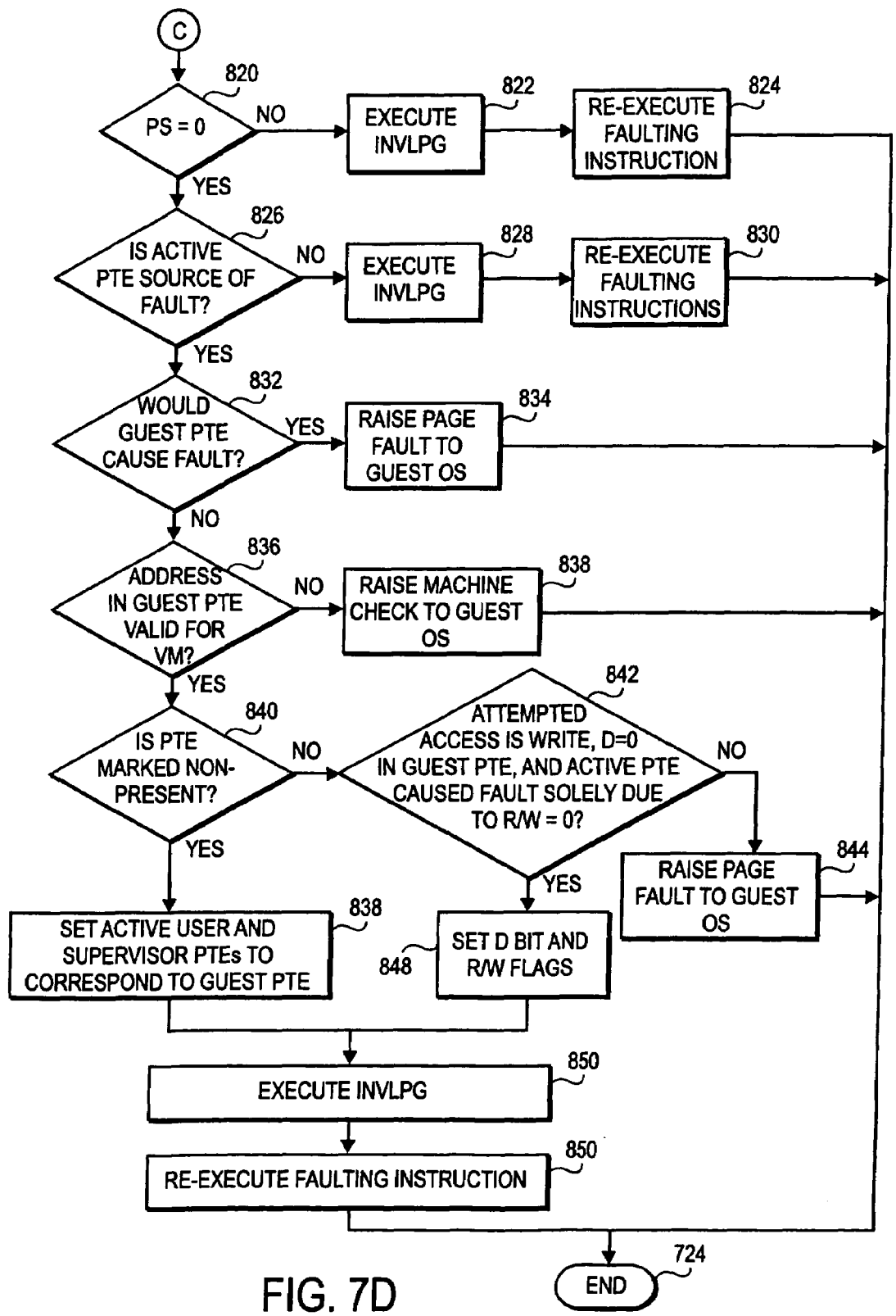

FIG. 6 illustrates operation of a virtual TLB 604 supporting IA-32 address translation, according to one embodiment of the present invention. Virtual TLB 604 includes an active translation data structure represented by an active page-table hierarchy 606 and a physical TLB 608. The active page-table hierarchy 606 derives its entries from a guest translation data structure represented by a guest page-table hierarchy 602. The VMM maintains for each virtual machine the value that the virtual machine expects for the control registers controlling address translation (i.e., CR0, CR2, CR3, and CR4). These control registers are referred to as guest control registers.

As described above, in one embodiment, the VMM creates two active page-table hierarchies 606 (an active user page-table hierarchy and an active supervisor page-table hierarchy) for each virtual machine to ensure that the protection desired by the guest OS is properly emulated. In one embodiment, all entries in both active page-table hierarchies 606 are initially marked invalid (using P flag described above) to emulate the initialization state of the TLB when the TLB has no entries. Subsequently, when guest software presents a virtual address to the processor, the processor finds only invalid entries in the active page-table hierarchy, and a page fault is generated. The page fault transitions control from the guest OS to the VMM. The VMM then copies corresponding entries from the guest page-table hierarchy 602 to the active page-table hierarchy 606. Thus, in this embodiment, the active page-table hierarchy 606 is refilled on page faults. One embodiment of handling page faults will be described in greater detail bellow in conjunction with FIGS. 7A-D.

As described above, the processor sets the accessed (A) bit and dirty (D) bit in the PD entries and PT entries. The virtual TLB emulates this behavior of the processor by maintaining A and D bits in the guest PD and PTs. In one embodiment, when a page is accessed by guest software for the first time, the processor attempts to set the A bit in the corresponding PT entry or PD entry in the active page-table hierarchy 606. In this embodiment, because the entries in the active page-table hierarchy are marked invalid until they are first accessed, the processor's attempt results in a page fault. The VMM monitor then sets the P bit in the in the corresponding PT entry or PD entry in the active page-table hierarchy 606, and sets the A bit in the corresponding PT entries or PD entries in the guest page-table hierarchy 602. The faulting instruction is then re-executed, and it will now not fault because the P bit in the PT entry or PD entry in the active page-table hierarchy has been set. The processor will then set the A bit in the PT entry or PD entry in the active page-table hierarchy.

With respect to the D bit, in one embodiment, the VMM maintains all entries in the active page-table hierarchy 606 as read-only (using the R/W flag) until the D bit is set in the corresponding entries of the guest page-table hierarchy 602. In particular, when guest software attempts to write a page, the processor attempts to set the D bit in the corresponding entry on the active page-table hierarchy 606 that is marked as read-only. As a result, a page fault is generated, and the VMM sets the R/W flag to read/write in the active page-table hierarchy 606 and the D bit in the guest hierarchy 602. The faulting instruction is then re-executed, and it will now not fault because the R/W flag in the PT entry or PD entry in the active page-table hierarchy has been set to read/write. The processor will then set the D bit in the PT entry or PD entry in the active page-table hierarchy.

Guest software is allowed to freely modify the guest page-table hierarchy 602 including changing virtual-to-physical mapping, permissions, etc. Accordingly, the active page-table hierarchy 606 may not be always consistent with the guest page-table hierarchy 602. That is, the active page-table hierarchy 606 may be out-of-date, e.g., it may allow too much access to its entries, provide wrong virtual-to-physical address mapping, etc. However, as described above in conjunction with FIG. 2, this behavior of the active page-table hierarchy 606 is acceptable (i.e., in a non-virtual machine environment, a page-table hierarchy may become inconsistent with a physical TLB, and problems caused by the inconsistencies are typically resolved using any of the instructions 216). When a problem arises from an inconsistency between the hierarchies 602 and 606, the guest OS, which treats the virtual TLB 604 as a physical TLB, will attempt to change the virtual TLB 604 using one of the instructions 216. These instructions result in the transfer of control from the guest OS to the VMM. The VMM will then determine the cause of the instruction and modify the content of the active page-table hierarchy 606 if necessary. For instance, if the guest page-table hierarchy 602 allows less access than the active page-table hierarchy 606, the VMM is architecturally permitted to allow greater access through the active page-table hierarchy 606 until guest software issues any of the instructions 216 to attempt to remove old entries that became invalid. The use of any of these instructions will transfer control to the VMM, which can then remove the entries referred to by guest software in the issued instruction from the active page-table hierarchy 606.

In one embodiment, the VMM selects the physical-address space that is allocated to guest software. Addresses installed by guest software in the guest CR3 612, in PD entries, and in PT entries (referred as "guest physical addresses") are considered by guest software to be physical addresses. In one embodiment, the VMM may map these addresses to different physical addresses.

As described above, in one embodiment, the VMM maintains more than one active page-table hierarchy (e.g., an active user page-table hierarchy and an active supervisor page-table hierarchy) for each virtual machine. In one embodiment, the U/S flag is set in all entries of the active supervisor page-table hierarchy to allow guest supervisor software to have access to all pages. In one embodiment, the R/W flag is set to 1 (i.e., read and write accesses are allowed) in the entries of the active supervisor page-table hierarchy if the write-protect bit in control register CR0 (CR0.WP) is set to 0. In one embodiment, if CR0.WP is set to 1, the R/W flag should also be set as in the corresponding entries of the guest page-table hierarchy. This requires the VMM to take special action when guest software attempts to modify CR0.WP.

FIGS. 7A-7D are flow diagrams of one embodiment of a method 700 for responding to a page fault. As described above, a page fault may result from an inconsistency between the active page-table hierarchy and the guest page-table hierarchy. The VMM may then modify the active page-table hierarchy and re-execute the faulting instruction. Alternatively, the hierarchies may already be consistent, and the fault should be handled by the guest OS.

Method 700 begins with evaluating an appropriate page directory entry (PDE) in the active user PD and a corresponding PDE in the active supervisor PD (processing block 704). In one embodiment, these active PDEs are located using the upper 10 bits of the faulting address and the two CR3 values maintained for this virtual machine.

At processing block 706, the intended privilege level of the guest software that generated the fault is determined to identify the corresponding active page-table hierarchy (i.e., either active user hierarchy or active supervisor hierarchy).

At decision block 708, a determination is made as to whether the active PDE being examined caused the page fault. In one embodiment, the determination depends on whether the active PDE is marked not present or its R/W bit and U/S bits are inconsistent with the attempted guest access.

If the determination is positive, the corresponding guest PDE is located (e.g., by using the upper 10 bits of the faulting address and the physical addresses that corresponds to the guest address in the guest CR3), and a decision is made as to whether the guest PDE could also cause the fault (decision box 710), e.g., whether the guest PDE is marked not present or present. If the guest PDE could also be the source of the fault, then the VMM raises the page fault to the guest OS (processing block 712). Otherwise, a further determination is made as to whether a physical address contained in the located guest PDE is valid for the virtual machine being supported (decision box 714). If the address is invalid, the VMM raises a machine check to the guest OS (processing block 716).

If the address is valid for this VM, the examination of the active PDE continues. Specifically, at decision box 718, a determination is made as to whether the active PDE is marked not present. If the determination is positive, the active user PDE and the active supervisor PDE are modified to correspond to the guest PDE. In particular, at decision box 730, a determination is made as to whether the guest PDE contains a page base address (i.e., if PS=1). If the guest PDE does not contain the page base address (i.e., it contains a PT base address instead), then two aligned 4 KB active PTs (active user PT and active supervisor PT) are allocated and marked invalid (processing block 732). Next, the page-table base addresses in the active user PDE and the active supervisor PDE are set to the physical addresses of the corresponding allocated PTs. Method 700 then proceeds to processing block 738.

If the determination made at decision box 730 is positive, the page base addresses in the two active PDEs are set to be the physical address that corresponds to the guest address in the guest PDE (processing block 736). Next, at processing block 738, the P and PS flags in the active PDEs are set to match the values of these flags in the guest PDE. At processing block 740, the U/S flag in the active supervisor PDE is set to 1 and the U/S flag in the active user PDE is set to the value of this flag in the guest PDE. At processing block 744, the A bit is set to 1 in the guest PDE.

Further, a determination is made as to whether the D bit is set to 0 in the guest PDE (decision box 746). If this determination is negative or if PS=0 (decision box 754), then a determination is made as to whether the guest software expects CR0.WP to be set to 0 (decision box 748). If the guest software does expect CR0.WP=0, then the R/W flag in the active supervisor PDE is set to 1 and the R/W flag in the active user PDE is set to the value of this flag in the guest PDE (processing box 752), and method 700 proceeds to processing block 768. Alternatively, if the guest software expects CR0.WP to be set to 1, then the R/W flag in the active supervisor PDE and in the active user PDE is set to the value of this flag in the guest PDE (processing block 750), and method 700 proceeds to processing block 768.

If the determination made in box 746 is positive, i.e., D=0 in the guest PDE, then a further decision is made as to whether the PS flag is set to 0 (decision box 754). If PS=0, method 700 proceeds to decision box 748. Otherwise, if PS=1, then yet further determination is made as to whether the attempted access is a write (decision box 755). If the attempted access is not a write, then the R/W flags in the active supervisor PDE and in the active user PDE are set to 0 (processing block 757), and method 700 proceeds to processing block 768. Alternatively, if the attempted access is indeed a write, then the D bit in the guest PDE is set to 1 (processing block 756) and the R/W flag in the active user PDE is set to this flag's value in the guest PDE (processing block 758). Next, if the guest software expects CR0.WP to be set to 0 (decision box 760), the R/W flag is set to 1 in the active supervisor PDE (processing block 764). Otherwise, if the guest software expects CR0.WP to be set to 1, then the R/W flag in the active supervisor PDE is set to match the value of this flag in the guest PDE (processing block 762).

Afterwards, at processing block 768, the INVLPG instruction is executed with the faulting address, and at processing block 770, the faulting instruction is re-executed.

Returning to decision box 708, if the determination is made that the active PDE is not the source of the page fault, then at decision box 820, a decision is made as to whether this active PDE refers to a 4 MB page, i.e., whether PS=1. If it is determined that the PS flag is set to 1 for this active PDE, it means that the fault resulted from an inconsistency between the active page-table hierarchy and the physical TLB. The VMM then executes the INVLPG instruction (processing block 822) and re-executes the faulting instruction (processing block 824). Alternatively, if the PS flag is set to 0 in the active PDE and the corresponding guest PDE, then the active user PTE and the active supervisor PTE are located (e.g., by using bits 21-12 of the faulting address and the above physical addresses of the active user PDE and the active supervisor PDE) and an appropriate active PTE (i.e., active user PTE or active supervisor PTE) is identified by determining the intended privilege level of the guest software that generated the fault. Next, a determination is made as to whether this active PTE caused the page fault (decision box 826). If this determination is negative, then the fault resulted from an inconsistency between the active page-table hierarchy and the physical TLB. The VMM executes the INVLPG instruction (processing block 828) and re-executes the faulting instruction (processing block 830).

If the determination is positive, i.e., the active PTE is the source of fault, the corresponding guest PTE is located (e.g., by using bits 21-12 of the faulting address and the physical addresses that corresponds to the guest page-table base address in the guest PDE), and a decision is made as to whether the guest PTE could also cause the fault, e.g., whether guest PTE is marked not present (decision box 832). If the guest PTE is the source of fault, then the VMM raises the page fault to the guest OS (processing block 834). Otherwise, method 700 continues with determining whether a physical address contained in the located guest PTE is valid for the virtual machine being supported (decision box 836). If the address is invalid, the VMM raises a machine check to the guest OS (processing block 838).

If the address is valid for this VM, the examination of the active PTE continues. Specifically, at decision box 840, a determination is made as to whether the active PTE as marked not present. If the determination is positive, the active user PTE and the active supervisor PTE are modified to correspond to the guest PTE (processing block 846). In one embodiment, the active PTEs are modified in the manner used for modification of the active PDEs for which PS=1 in the corresponding guest PDEs (described above in conjunction with FIG. 7B).

Alternatively, if the active PTE is marked present, a determination is made at decision box 842 as to whether certain conditions apply (i.e., whether the attempted access is a write, D=0 in the guest PTE, and the active PTE has caused the page fault solely because its R/W flag is set to 0). If the determination is positive, then at processing block 848, the D flag is set to 1 in the guest PTE. The R/W flag in the guest user PTE is set to the value of the R/W flag in the guest PTE. R/W is set to 1 in the active supervisor PTE to 1 if the guest software expects CR0.WP to be set to 0; otherwise, this flag is set to its value in the guest PTE. If the determination made at box 842 is negative (i.e., the active PTE is marked present and none of the above conditions apply), the page fault is raised to the guest OS (processing block 844).

After completing either of processing blocks 846 or 848, the VMM executes the INVLPG instruction (processing block 850) and re-executes the faulting instruction (processing block 852).

Returning to decision box 718, if the active PDE entry is marked present, a further determination is made at decision box 720 as to whether a set of conditions is satisfied. A first condition within the set of conditions requires that the attempted access be a write. The second condition requires that PS=1 and D=0 in the guest PDE. The third condition requires that the PDE caused the fault solely because its R/W is set to 0. If any of these three conditions is not satisfied, then the page fault is raised to the guest OS (processing block 722). Otherwise, if all of these conditions are satisfied, then the D bit is set to 1 in the guest PDE (processing block 802), and a decision is made as to whether the guest software expects CR0.WP be set to 0 (decision box 804). If the determination is negative, then R/W in the active supervisor PDE is set to match the value of this flag in the guest PDE (processing block 806), and method 700 proceeds to processing block 809. Alternatively, if the guest software expects CR0.WP be set to 0, then R/W is set to 1 in the active supervisor PDE (processing block 808). In either case, R/W in the active user PDE is set to match the value of this flag in the guest PDE (processing block 809). Further, the VMM executes the INVLPG instruction (processing block 810) and re-executes the faulting instruction (processing block 812).

Figure 8:
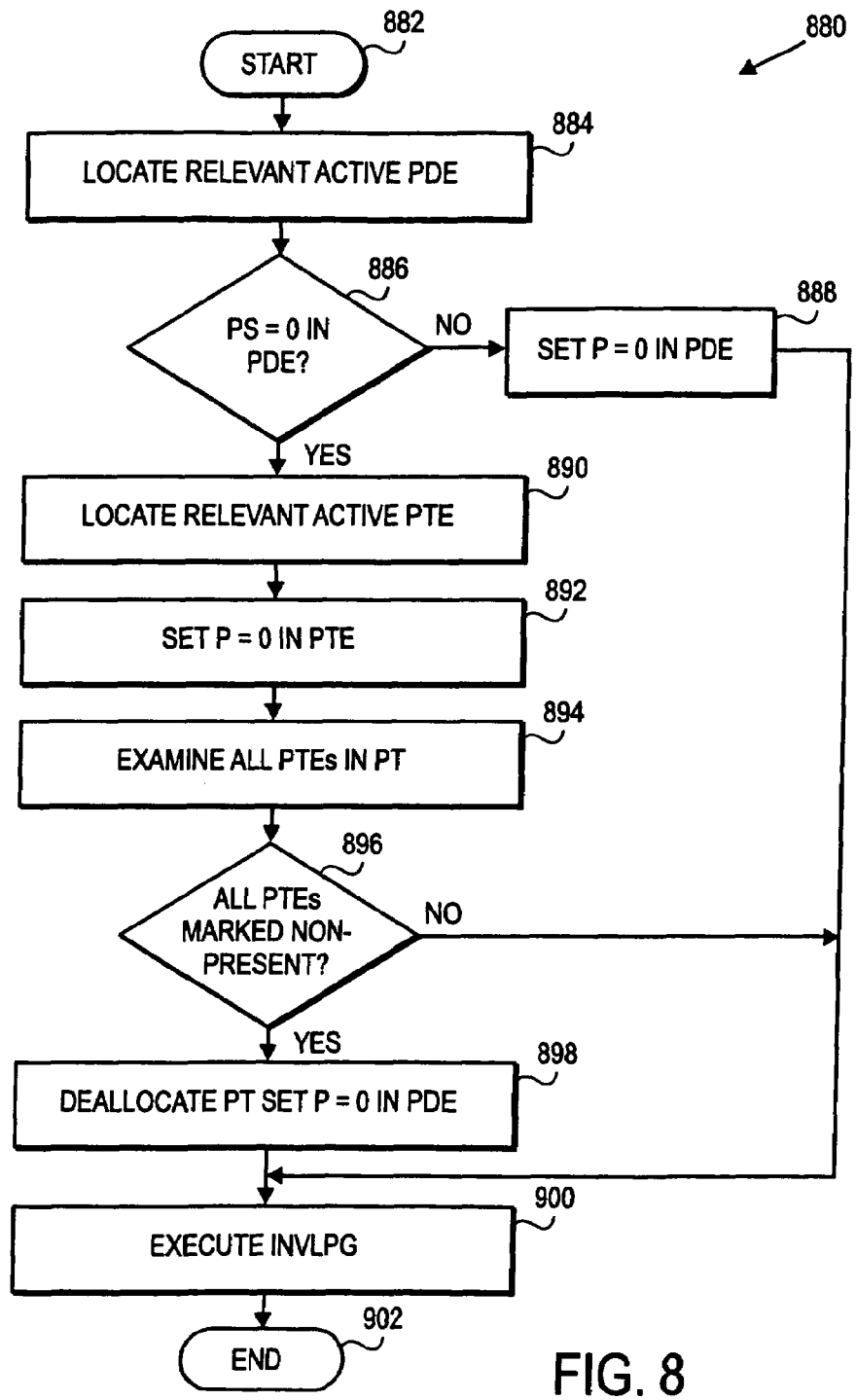
FIG. 8 is flow diagram of a method for responding to an INVPLG instruction issued by a guest OS, according to one embodiment of the present invention.

FIG. 8 is flow diagram of one embodiment of a method 880 for responding to an INVPLG instruction issued by a guest OS. As described above, typically an OS can use INVLPG to remove entries that are no longer valid from the physical TLB. Since the guest OS considers the active translation data structure to be a part of the physical TLB, it issues the INVLPG instruction to resolve any problem caused by an inconsistency between the active translation data structure and the guest translation data structure. An attempt of the guest OS to execute INVLPG results in transfer of control from the guest OS to the VMM. The VMM then modifies the active translation data structure (e.g., the active user page-table hierarchy and the active supervisor page-table hierarchy) to emulate the desired effect of INVPLG.

Method 880 begins with locating the relevant active PDE (processing block 884). In one embodiment, the active PDE is located using the upper 10 bits of the instruction operand address and the current value of CR3.

At decision box 886, a determination is made as to whether the active PDE refers to a 4 MB (i.e., whether PS=0). If the determination is negative, the active PDE is marked not present (i.e., the P flag is set to 0), and method 880 proceeds to processing block 900. Alternatively, if PS=0 and the active PDE is marked present, then the relevant active PTE is located (processing block 890) and its P flag is set to 0 (processing block 892). In one embodiment, the active PTE is located using bits 21-12 of the operand address and the PT base address in the PDE.

Further, at processing block 894, all entries in the active PT are examined (processing block 894), and determination is made as to whether all these entries are now marked as not present. If the determination is negative, method 880 proceeds to processing block 900. Otherwise, if all PTEs in this active PT are marked not present, then the active PT is deallocated and the P flag in the active PDE is set 0. Afterwards, the VMM executes INVLPG with the faulting address (processing block 900) and control returns to the guest OS.

The guest OS may also attempt to load from or store to CR3 or initiate task switch, causing a change of address space, which may necessitate invalidation of the entire TLB. As described above, any of these attempts will result in transferring control from the guest OS to the VMM. The VMM can then modify the active page-table hierarchy to emulate the desired effect of any of the above operations (i.e., the effect of removing the cached address translations). In one embodiment, the VMM deallocates all active PTs that have been allocated, marks both active PDEs as invalid, reloads CR3 with its current value (to flush the physical TLB), and then returns control to the guest OS.

Figure 9:
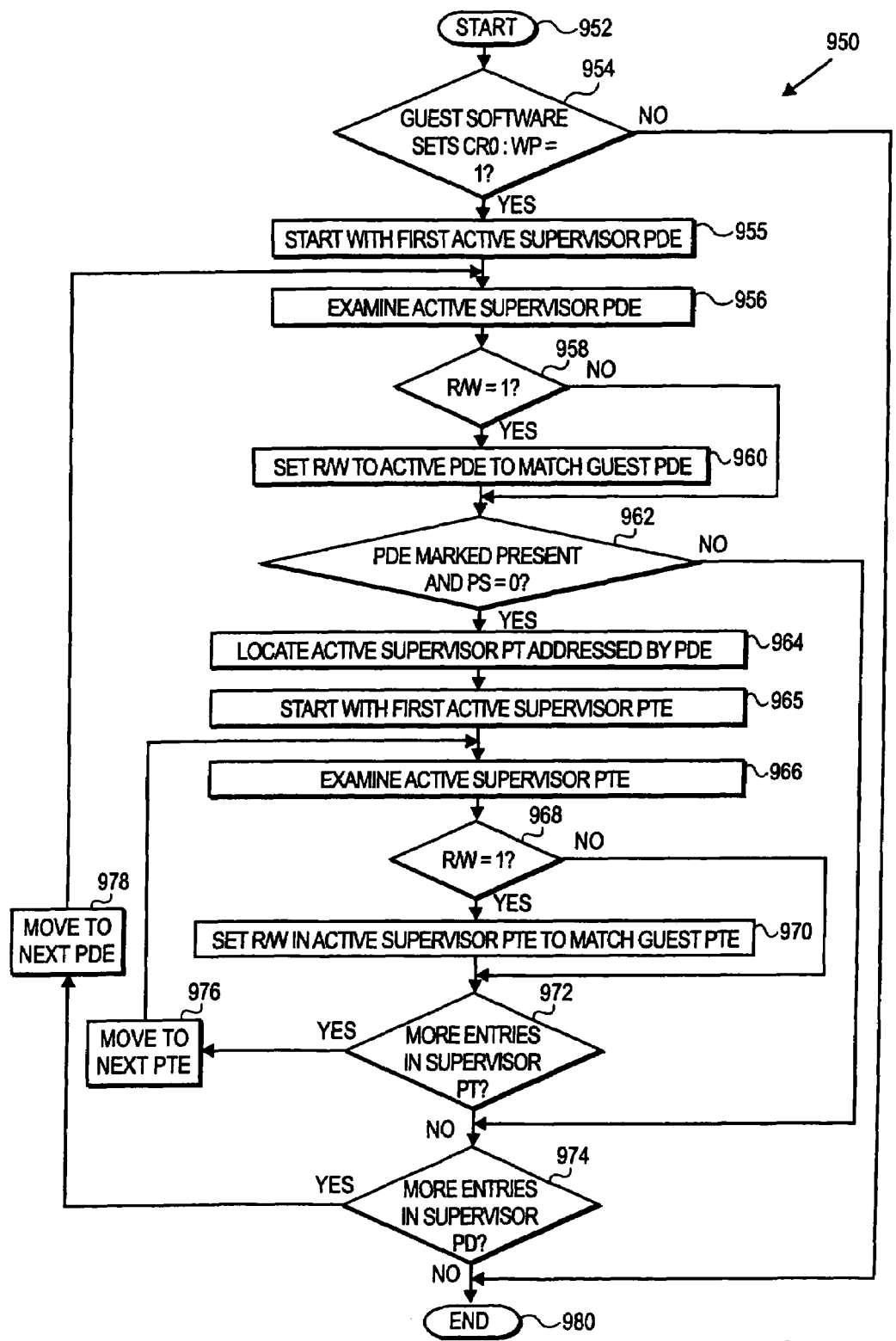
FIG. 9 is a flow diagram of a method for handling an attempt of a guest OS to modify the write-protect bit in control register CR0, according to one embodiment of the present invention.

FIG. 9 is a flow diagram of one embodiment of a method 950 for handling an attempt of a guest operating system to modify the write-protect bit in control register CR0. As described above, the content of the guest supervisor page-table hierarchy depends on the value that the guest OS intends to establish for CR0.WP. Specifically, this intended value affects the values of the R/W flags in the guest PDEs and PTEs. Accordingly, the VMM takes control over the guest OS's attempt to modify CR0.WP and performs a set of actions illustrated in FIG. 9.

Method 950 begins with making a determination as to whether the guest OS attempts to set CR0.WP to 1. If the determination is negative, it means that guest supervisor software may be allowed to write to pages that have been protected. In this case, the VMM does not need to take any additional actions. That is, if the guest supervisor software attempts to write to the protected pages, a page fault will be generated, and the VMM will correct the situation as described above in conjunction with FIGS. 7A-7D.

Alternatively, if the guest OS attempts to set CR0.WP to 1, it may result in protecting some pages from writes by guest supervisor software. The VMM then needs to modify the active supervisor page-table hierarchy accordingly. In one embodiment, the VMM evaluates each active supervisor PDE. Specifically, the VMM starts with the first entry in the active supervisor PD (processing block 955), examines this active supervisor PDE (processing block 956), and determines whether the R/W flag is set to 1 in this active supervisor PDE (decision box 958). If the determination is positive, the R/W flag in the active supervisor PDE is set to the value of this flag in the corresponding guest PDE (processing block 960).

Next, at decision box 962, a determination is made as to whether the active supervisor PDE being examined is marked present and refers to a page table (i.e., PS=0). If the determination is negative, method 950 proceeds to decision box 974. Alternatively, the VMM locates the active supervisor page table addressed by the PDE (processing block 964) and evaluates each active supervisor PTE. Specifically, the VMM begins with the first entry in the active supervisor PT (processing block 965), examines this active supervisor PTE (processing block 966), and determines whether its R/W flag is set to 1 (decision box 968). If the determination is positive, then the R/W flag is set to this flag's value in the guest PTE (processing block 970).

After all active supervisor PTEs are examined, the VMM evaluates the next active supervisor PDE in the same manner. Method 950 ends when no more entries remain in the active supervisor PD.

As described above in conjunction with FIGS. 7A-7D and 8, in some embodiments, the VMM evaluates only the active PDEs and PTEs that correspond to the virtual address that generated a page fault or that was the operand of an INVLPG instruction, thereby emulating the behavior of the physical TLB. Performance may be improved by an alternative embodiment, which may reduce the number of page faults that need to be handled by the VMM. This alternative embodiment (referred to as an eager filling of the virtual TLB technique) provides a method for re-evaluating the entire guest translation data structure and the entire content of the active translation data structure(s) in response to receiving control over any operation that may require modification of the virtual TLB.

Figure 10A:
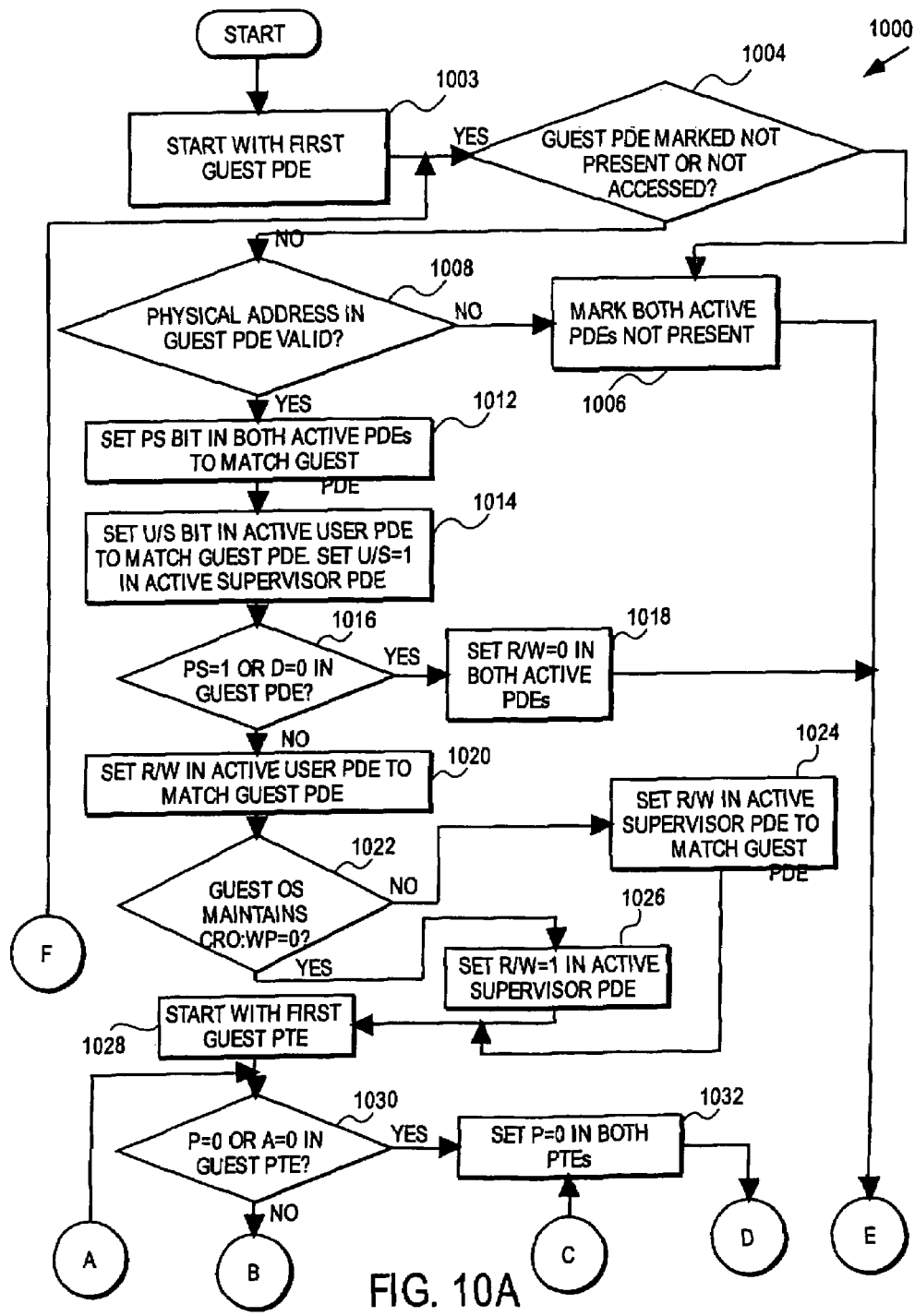
FIGS. 10A and B are flow diagram of a method for responding to an operation that may require modification of a virtual TLB using an eager-filling technique, according to one embodiment of the present invention.
Figure 10B:
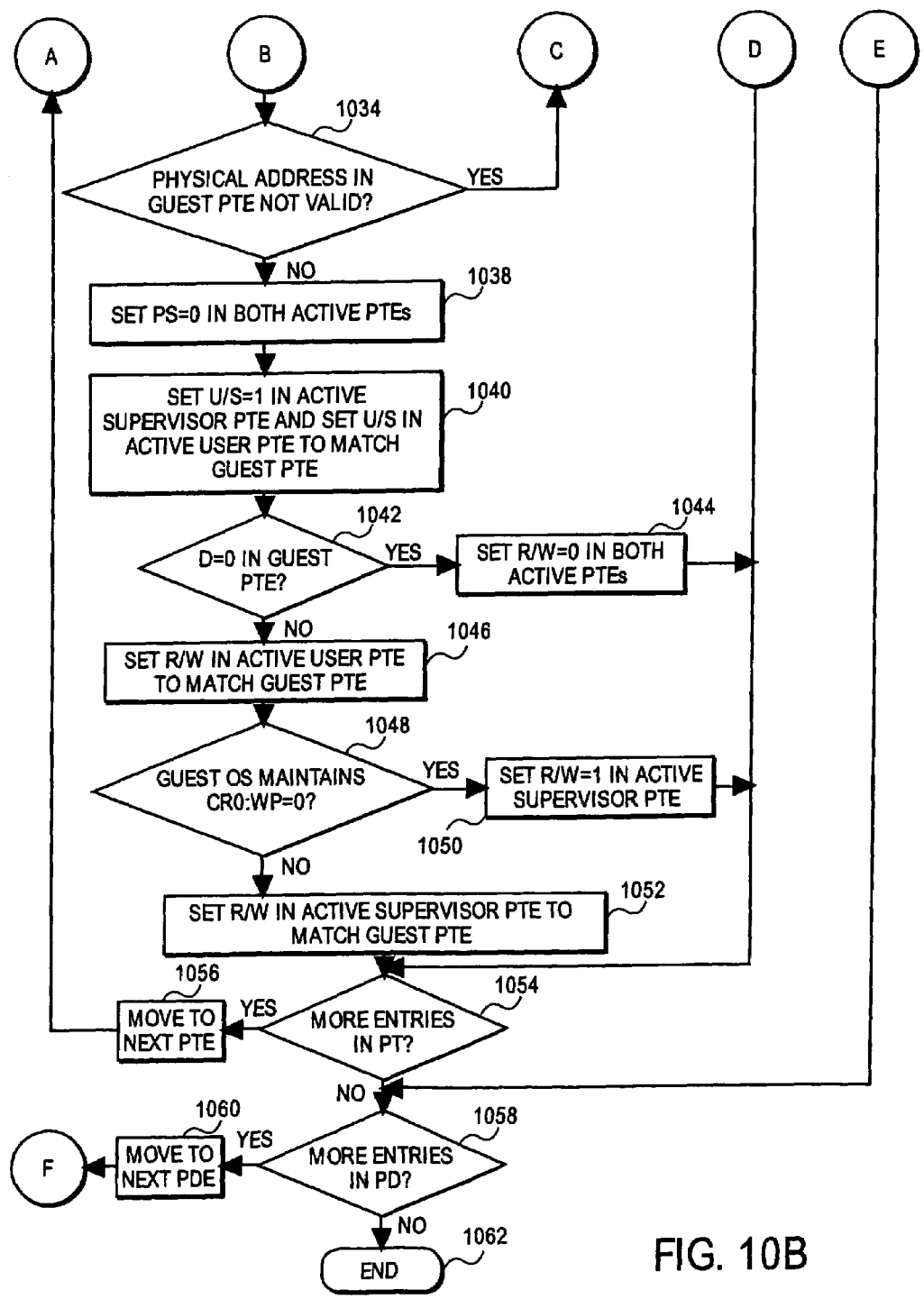

FIGS. 10A and B are flow diagrams of one embodiment of a method 1000 for responding to an operation that may require modification of a virtual TLB using an eager filling of the virtual TLB technique. Upon receiving control of such an operation, the VMM locates the guest PD using the guest OS's value for CR3 and evaluates each guest PDE.

Method 1000 begins with examining the first entry in the guest PD (processing block 1003) and making a determination as to whether this guest PDE is marked not present (i.e., P=0) or not accessed (A=0) (decision box 1004). If the determination is positive, the active user PDE and active supervisor PDE are marked not present (processing block 1006), and method 1000 proceeds to decision box 1058. Alternatively, a further determination is made as to whether a physical address contained in the guest PDE is valid for the virtual machine being supported (decision box 1008). If the address is invalid, the active user PDE and active supervisor PDE are marked not present (processing block 1006), and method 1000 proceeds to decision box 1058.

If the address is valid for this VM, at processing block 1012, the PS flag in the active user PDE and the active supervisor PDE is set to match the value of this flag in the guest PDE. At processing block 1014, the U/S flag in the active supervisor PDE is set to 1 and the U/S flag in the active user PDE is set to the value of this flag in the guest PDE.

Further, at decision box 1016, a determination is made as to whether the guest PDE is for a 4 MB page (PS=1) and is marked not dirty (D=0) (decision box 1016). If this determination is positive, the R/W flag is set to 0 in both the active user PDE and the active supervisor PDE (processing block 1018), and method 1000 proceeds to decision box 1058. Otherwise, if the guest PDE is for a page table or marked dirty, then the R/W flag in the active user PDE is set to this flag's value in the guest PDE (processing block 1020) and a further determination is made as to whether the guest software maintains CR0.WP=0 (decision box 1022). If the guest software does expect CR0.WP to be equal to 0, then the R/W flag in the active supervisor PDE is set to 1 (processing block 1026). Alternatively, if the guest software expects CR0.WP to be set to 1, then the R/W flag in the active supervisor PDE is set to the value of this flag in the guest PDE (processing block 1024).

Next, each PTE in the guest page table that is referred to in the guest PDE is evaluated. In particular, the evaluation begins with the first entry in the guest PT (processing block 1028) and, at decision box 1030, a determination is made as to whether this guest PTE is marked not present or not accessed. If the determination is positive, then both the active user PTE and the active supervisor PTE are marked not present, and method 1000 proceeds to decision box 1054. Alternatively, a further determination is made as to whether a physical address contained in the guest PTE is valid for the virtual machine being supported (decision box 1034). If the address is invalid, the active user PTE and active supervisor PTE are marked not present (processing block 1032), and method 1000 proceeds to decision box 1054.

If the address is valid for this VM, at processing block 1038, the PS flag in the active user PTE and the active supervisor PTE is set 0. At processing block 1014, the U/S flag in the active supervisor PTE is set to 1 and the U/S flag in the active user PTE is set to the value of this flag in the guest PTE.

Further, at decision box 1042, a determination is made as to whether the guest PTE is marked not dirty (D=0) (decision box 1042). If this determination is positive, the R/W flag is set to 0 in both the active user PTE and the active supervisor PTE (processing block 1044), and method 1000 proceeds to decision box 1054. Otherwise, if the guest PTE is marked dirty, then the R/W flag in the active user PTE is set to this flag's value in the guest PTE (processing block 1046) and a further determination is made as to whether the guest software maintains CR0.WP=0 (decision box 1048). If the guest software does expect CR0.WP to be equal to 0, then the R/W flag in the active supervisor PTE is set to 1 (processing block 1050). Alternatively, if the guest software expects CR0.WP to be set to 1, then the R/W flag in the active supervisor PTE is set to the value of this flag in the guest PTE (processing block 1052).

Next, at decision box 1054, a determination is made as to whether more entries remain in the guest PT. If the determination is positive, method 1000 moves to the next guest PTE and its examination begins at decision box 1030. After all the entries in the guest PT are examined, the examination of other guest PDEs continues until no more entries remain in the guest PD.

Figure 11:
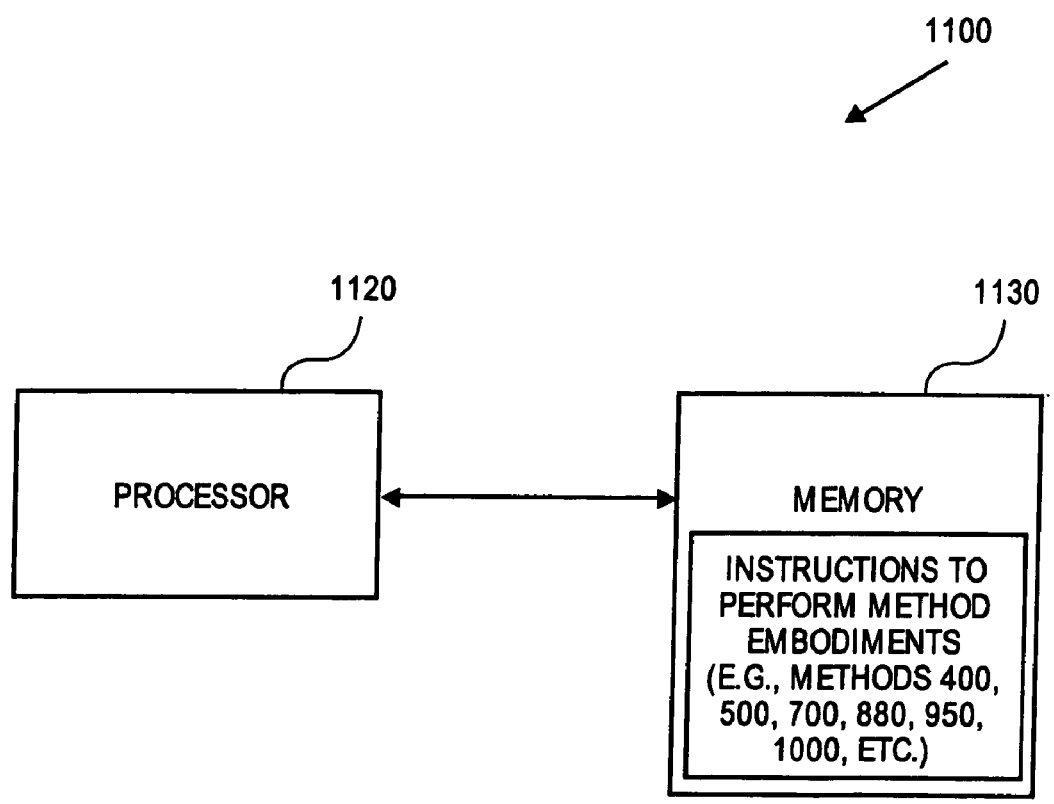
FIG. 11 is a block diagram of one embodiment of a processing system.

FIG. 11 is a block diagram of one embodiment of a processing system. Processing system 1100 includes processor 1120 and memory 1130. Processor 1120 can be any type of processor capable of executing software, such as a microprocessor, digital signal processor, microcontroller, or the like. Processing system 1100 can be a personal computer (PC), mainframe, handheld device, portable computer, set-top box, or any other system that includes software.

Memory 1130 can be a hard disk, a floppy disk, random access memory (RAM), read only memory (ROM), flash memory, or any other type of machine medium readable by processor 1120. Memory 1130 can store instructions for performing the execution of the various method embodiments of the present invention such as methods 400, 500, 700, 880, 950 and 1000 (FIGS. 4, 5, 7A-7D, 8, 9, 10A and 10B).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for a virtual machine monitor (VMM) comprising:
    determining whether an event initiated by guest software pertains to a translation-lookaside buffer (TLB); and
    if the event initiated by the guest software pertains to the TLB, modifying content of an active translation data structure controlled by the VMM to conform to content of a guest translation data structure used by a guest operating system for address translation operations, the content of the active translation data structure being used by a processor to cache address translations in the TLB.

2. The method of claim 1 wherein the event was initiated due to a potential inconsistency between one or more entries in the active translation data structure and corresponding entries in the guest translation data structure.

3. The method of claim 2 wherein the corresponding entries in the guest translation data structures are associated with the event.

4. The method of claim 2 wherein the corresponding entries in the guest translation data structures comprise entries unrelated to the event.

5. The method of claim 1 further comprising emulating functionality of the TLB in response to an address-translation operation performed by the guest operating system.

6. The method of claim 1 wherein determining whether the event initiated by guest software pertains to the TLB comprises:
    determining whether the event is associated with a page fault that would not occur under operation of the guest software in a non-virtual environment.

7. The method of claim 6 further comprising:
    modifying the content of the active translation data structure if the event is associated with the page fault that would not occur under operation of the guest software in the non-virtual environment; and passing control over the event to the guest software if the event is associated with a page fault that would occur under operation of the guest software in the non-virtual environment.

8. The method of claim 1 wherein determining whether the event initiated by guest software pertains to the TLB comprises:
determining whether the event was caused by an attempt of the guest software to remove entries from the TLB.

9. The method of claim 8 further comprising:
modifying the content of the active translation data structure if the event was caused by the attempt of the guest software to remove entries from the TLB.

10. The method of claim 1 further comprising initializing the active translation data structure by invalidating every entry in the active translation data structure to emulate the TLB with no entries.

11. The method of claim 1 further comprising maintaining the active translation data structure for each virtual machine running on a computer.

12. The method of claim 1 further comprising maintaining the active translation data structure for each set of privilege levels that can be distinguished by page-based protection.

13. The method of claim 1 further comprising:
determining that the event is caused by an attempt of the guest software to change a privilege level; and
determining whether the changed privilege level affects page-based protection.

14. The method of claim 1 further comprising:
determining that a page fault was caused by an attempt of the guest software to access memory using an entry of the active translation data structure that is marked as an invalid entry;
determining that a corresponding entry in the guest translation data structure is marked as a valid entry with an accessed flag set to a not-accessed value;
marking the entry in the active translation data structure as a valid entry; and
setting the accessed flag in the entry of the guest translation data structure to an accessed value.

15. The method of claim 1 further comprising:
determining that a page fault was caused by an attempt of the guest software to write to memory using an entry of the active translation data structure that is marked as an invalid entry or a read-only entry;
determining that a corresponding entry in the guest translation data structure is marked as a valid read/write entry with a modified flag set to a not-modified value;
marking the entry in the active translation data stricture as a valid read/write entry; and
setting the modified flag in the entry of the guest translation data structure to a modified value.

16. A system comprising:
a flash memory;
a random access memory (RAM) to store a guest translation data structure used by a guest operating system for address translation operations and an active translation data structure managed by a virtual machine monitor (VMM); and
a processor, coupled to the flash memory and the RAM, to contain a translation-lookaside buffer (TLB), to determine whether an event initiated by guest software pertains to the TLB, and to modify content of the active translation data structure to conform to content of the guest translation data structure if the event initiated by the guest software pertains to the TLB.

17. The system of claim 16 wherein the event was initiated due to a potential inconsistency between one or more entries in the active translation data structure and corresponding entries in the guest translation data structure.

18. The system of claim 17 wherein the corresponding entries in the guest translation data structures are associated with the event.

19. The system of claim 17 wherein the corresponding entries in the guest translation data structures comprise entries unrelated to the event.

20. A computer readable medium that provides instructions, which when executed on a processor, cause said processor to perform a method for a virtual machine monitor (VMM) comprising:
determining whether an event initiated by guest software pertains to a translation-lookaside buffer (TLB); and
if the event initiated by the guest software pertains to the TLB, modifying content of an active translation data structure controlled by the VMM to conform to content of a guest translation data structure used by a guest operating system for address translation operations, the content of the active translation data structure being used by a processor to cache address translations in the TLB.

21. The computer readable medium of claim 20 wherein the event was initiated due to a potential inconsistency between one or more entries in the active translation data structure and corresponding entries in the guest translation data structure.

22. The computer readable medium of claim 20 wherein the method further comprises emulating functionality of the TLB in response to an address-translation operation performed by the guest operating system.

* * * * *